US006400716B1

(12) United States Patent
Munakata et al.

(10) Patent No.: US 6,400,716 B1
(45) Date of Patent: Jun. 4, 2002

(54) ASYNCHRONOUS TRANSMISSION MODE SWITCH AND CONTROL METHOD OF THE ASYNCHRONOUS TRANSMISSION MODE SWITCH

(75) Inventors: Yuji Munakata; Sachito Shibata, both of Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/170,661

(22) Filed: Oct. 13, 1998

(30) Foreign Application Priority Data

Feb. 16, 1998 (JP) ............................................ 10-032914

(51) Int. Cl.⁷ ............................................... H04L 12/28
(52) U.S. Cl. ........................ 370/395; 370/248; 370/241
(58) Field of Search ................................ 370/395, 396, 370/398, 400, 216, 217, 218, 241, 248, 250, 242, 219, 221, 224, 389, 392, 412, 244, 251, 252, 253

(56) References Cited

U.S. PATENT DOCUMENTS 5,321,688 A * 6/1994 Nakano ....................... 370/244
6,167,025 A * 12/2000 Hsing .......................... 370/216
6,181,680 B1 * 1/2001 Nagata ........................ 370/248

FOREIGN PATENT DOCUMENTS

JP          8251194        9/1996
JP          10-13422       1/1998

* cited by examiner

Primary Examiner—Douglas Olms
Assistant Examiner—Ricardo M. Pizarro
(74) Attorney, Agent, or Firm—Katten Muchin Zavis Rosenman

(57) ABSTRACT

An ATM switch comprises a detector that detects impairments in signal lines, and a controller that controls the preservation of paths that have been established by call control via a signal line when an impairment has been detected on a signal line by the detector. When an impairment has occurred only on a signal line, interruptions in communications services are prevented by causing the data line paths to be preserved rather than released.

17 Claims, 33 Drawing Sheets

× Inpairment point
—— Path
    Signal line

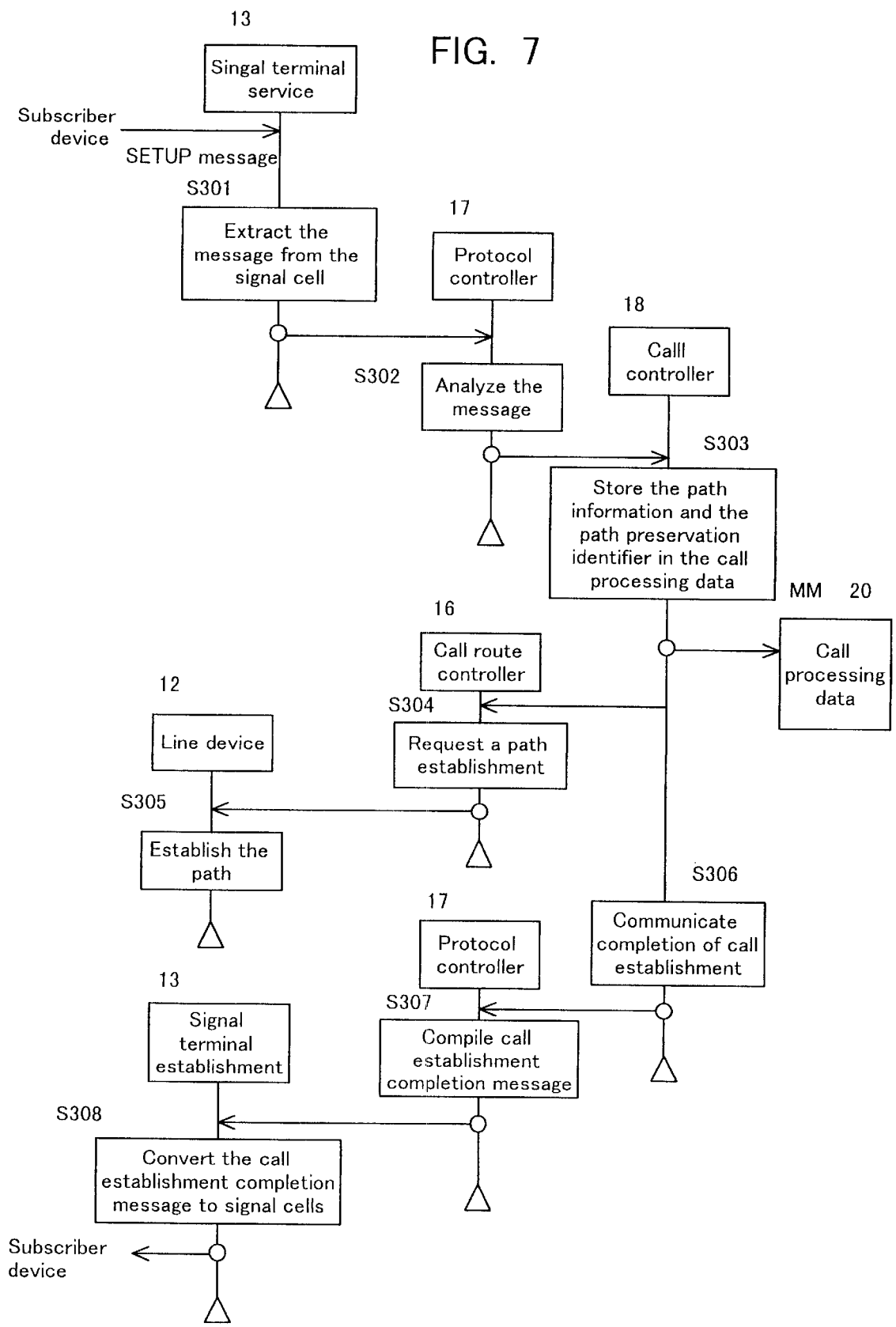

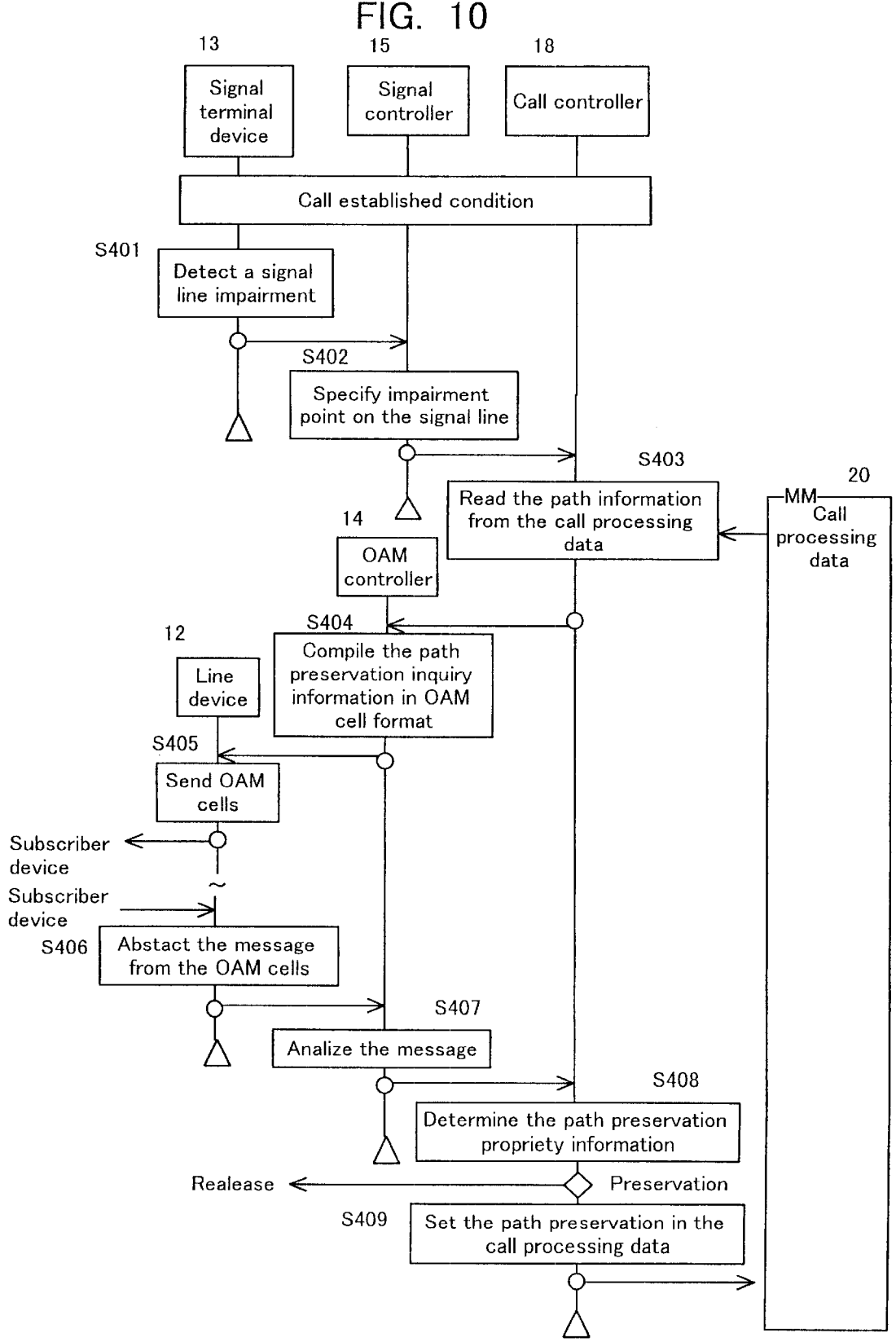

× Inpairment point
—— Path
····· Signal line

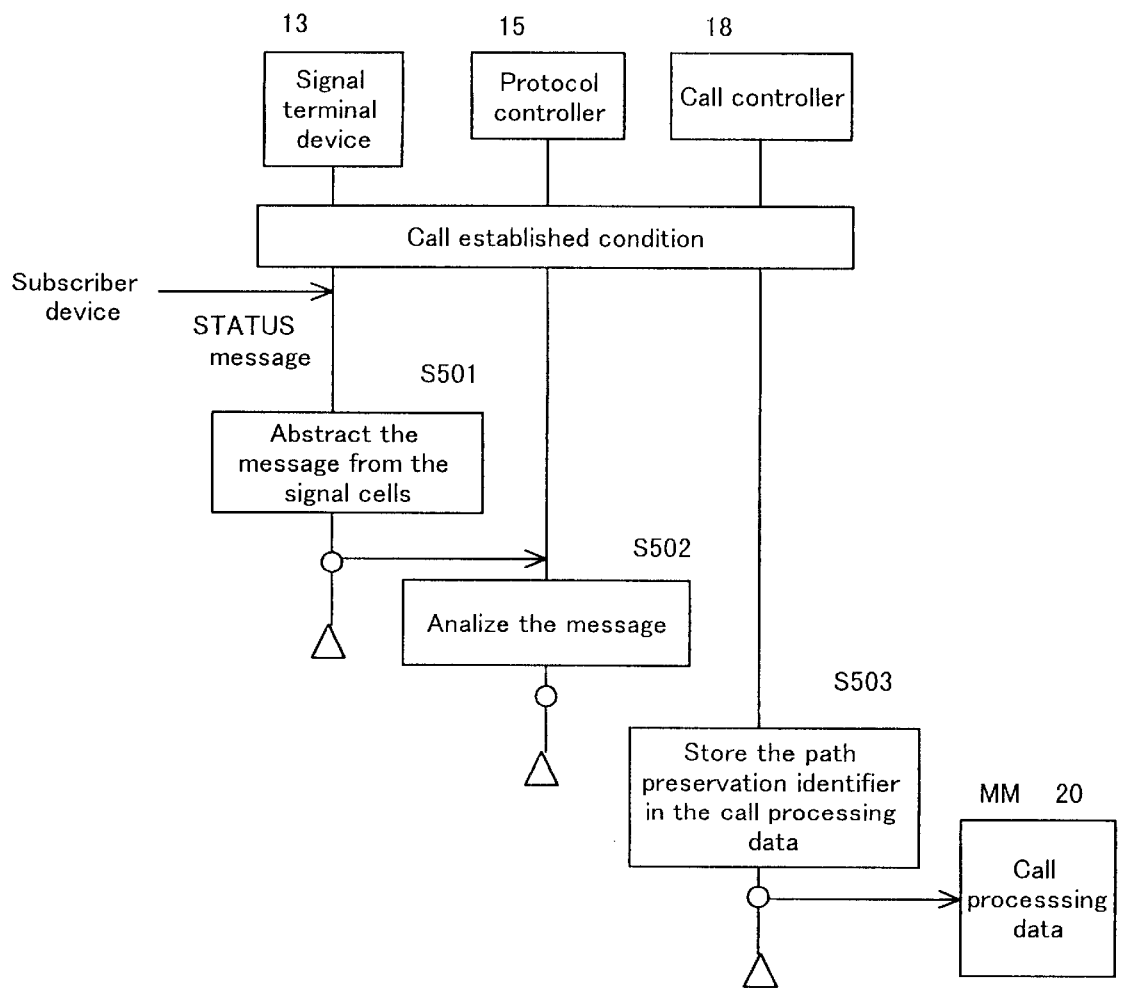

× Impairment point
—— Path
-- Signal line (Normal)

(Path preserved)

×   Inpairment point

—— Path

· · · Signal line

×    Inpairment point
——   Path
----   Signal line (Normal)

(Path preserved)

ASYNCHRONOUS TRANSMISSION MODE SWITCH AND CONTROL METHOD OF THE ASYNCHRONOUS TRANSMISSION MODE SWITCH

BACKGROUND OF THE INVENTION

1. Field of the Invention

This invention concerns an ATM(asynchronous transmission mode) switch in an ATM network, and more particularly concerns a method for path control during signal line impairment in the ATM switch.

2. Description of the Related Art

The use of ATM network today is being expanded rapidly by LAN/WAN and internet applications, and it is now predicted that its use will spread to data switching in VOD (video on demand) services.

FIG. 31 is a diagram of an example configuration in an ATM network. According to FIG. 31, a preexisting telephone network, the internet, and a VOD network are connected via ATM networks.

ATM switching services are now shifting from the PVC (permanent virtual channel) services currently popular for dedicated line services to SVC (switched virtual channel) services that operate on an on-demand basis. SVC services include TPCC (third party call control) services that control signal lines by proxy, so that subscribers who do not have signal lines for transmitting call-establishing and other signal cells can avail themselves of SVC services. This TPCC service is able to control the paths to multiple terminals with a single signal line, and is beginning to be used in services such as VOD.

FIG. 32 diagrams an example of a TPCC operating configuration. In FIG. 32, a subscriber device (terminal) A having no signal line uses a preexisting telephone network (cf. line (1) in the figure) to request to establish or release an SVC path (cf. line (3)) with a signal proxy server (terminal) C having a signal line. When the link between the subscriber device A and the signal proxy server C is established by a PVC-based path (cf. line (2)), the request to establish or release the SVC path (cf. line (3)) is conducted by the PVC path. The signal proxy server (terminal) C that receives the request from the subscriber device A provides an SVC path (cf. line (3)) between the subscriber device A and terminal B (which is either another subscriber device or a VOD server), via an ATM switch D, using a signal line (cf. line (4)) that is for SVC performance.

A point-to-multipoint service that is a 1-to-n connection configuration is also a service wherewith one subscriber device can establish paths with a plurality of other subscribers, with a single signal line.

FIG. 33 is a diagram of an example point-to-multipoint (hereinafter P-MP) operating configuration. According to FIG. 33, multiple paths are established between one subscriber device and a plurality of other subscriber devices by means of the P-MP signal control functions, P-MP call control functions, and cell copy functions of an ATM switch.

Thus, from this time forward, the mainstream will increasingly become SVC connection services that are provided using signal procedures that can appropriately select and designate path (virtual channel) bands, quality, and traffic according to the data cell being transmitted.

With the prior art, however, in situations where SVC services are implemented with various operations expected thereof, as discussed above, when a signal line is impaired, all paths controlled by that signal are released, and the call (path) cannot be reestablished until that signal line is restored.

However, forcibly releasing established paths just because a signal line is impaired leads to a decline in service quality. It is foreseen, moreover, that among the highly diverse services that are now going to be using ATM switching will be those wherewith data transmission interruptions cannot be allowed.

In VOD services, for example, when paths are connected via ATM switch between a server providing data and multiple subscriber devices, should an impairment occur in a signal line between the server and the ATM switch, this impairment of a single signal line would unavoidably result in the release of all paths between the server and the subscribers and, hence, a decline in subscriber service.

SUMMARY OF THE INVENTION

Accordingly, an object of the present invention is to provide ATM switch wherewith, in an ATM network system, data transmission will not be interrupted even when an impairment occurs in a signal line.

In order to achieve this object, the ATM switch of the present invention comprises a detector that detects impairments in signal lines, and a controller that controls the preservation of paths that have been established by call control via a signal line when an impairment has been detected on a signal line by the detector.

When an impairment has occurred only on a signal line, it is possible to prevent interruptions in communications services by causing the data line paths to be preserved rather than released.

Preferably, the controller should send a information of the fact that the path has been preserved to the terminals or to another asynchronous transmission mode switch connected to the path, as noted earlier, via the path.

And, preferably, the controller should release the path, based on a path release request information sent via the path from either a terminal connected to the path or from the another asynchronous transmission mode switch.

And preferably, as soon as the signal line has been restored, the controller should send a signal line restart information via the path, to the terminals or the another asynchronous transmission mode switch.

Because call control cannot be performed using a signal line due to an impairment on the signal line, information needed for various kinds of call control are sent using a path that is the data line. At such times, the information sent over the path may be configured by OAM cells, for example. Other features and advantages of the present invention will become readily apparent from the following description when taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 7 is a processing flowchart (1 of 2) for the third embodiment of the present invention;

FIG. 10 is a processing flowchart for the fourth embodiment of the present invention;

FIG. 12 is a processing flowchart (1 of 2) for the fifth embodiment of the present invention;

DESCRIPTION OF THE PREFERRED EMBODIMENTS

Embodiments of the present invention will now be described. However, it should be noted that the technological scope of the present invention is not limited by these embodiments.

Figure 1:
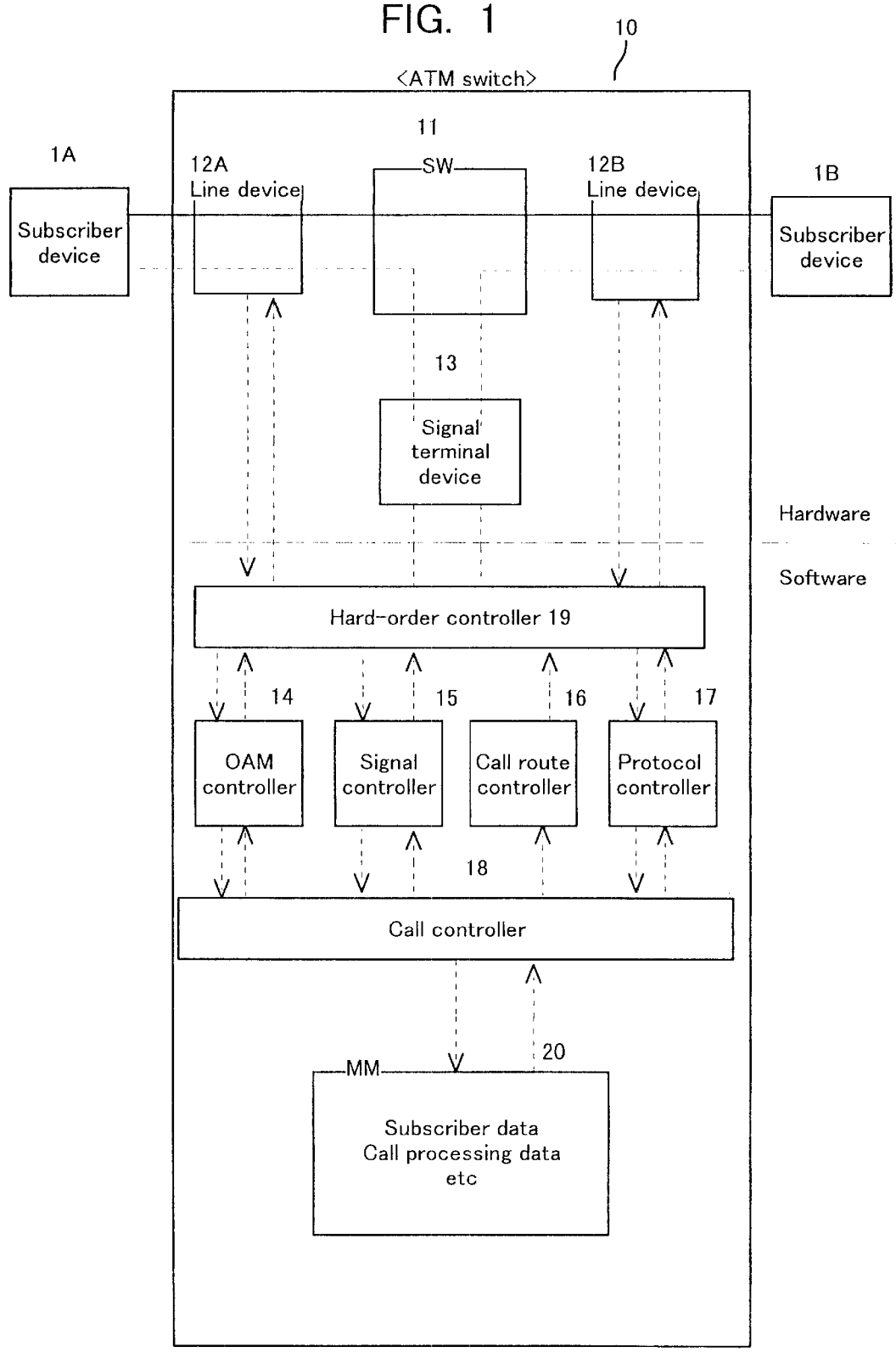
FIG. 1 is a block diagram of ATM switch in an ATM network system that is an embodiment of the present invention.

FIG. 1 is a block diagram of ATM exchange equipment 10 in an ATM network system that is an embodiment of the present invention. In FIG. 1, switch (SW) 11 routes data cells sent from subscriber device 1A or 1B by means of hardware switching.

Each of the line devices 12A and 12B is either the terminal of the subscriber device 1A or 1B, or a device that terminates a transmission route between separate ATM switch (not shown). For example, the line device 12A, having received a data cell from the subscriber device 1A, tags the data cell and sends it to the switch 11. Then the line device 12B, having received the data cell routed to it by the switch 11, removes the tag, and sends the data cell to the subscriber device 1B. Also, the line device 12A that has received an OAM cell from the subscriber device 1A makes information of the OAM cell to an OAM controller 14 (described below). The OAM cell is sent to the subscriber device 1B according to an OAM cell sending request from the OAM controller 14.

The signal terminal device 13 is a device that terminates signal cells used for such call processing as establishing or releasing paths (virtual channels (VCs)) from subscriber device 1A or 1B. Occurrences of impairments in signal lines, and restorations thereof, are notified to a signal controller 15 (described below). The functions of the switch 11, line devices 12, and signal terminal device 13 are implemented in hardware.

The functions of the OAM controller 14, signal controller 15, call route controller 16, protocol controller 17, and call controller 18 (described below) are implemented in software. A hard-order controller 19 provides the interface between these hardware and software functions.

The OAM controller 14 analyzes OAM (operation administration maintenance) cells sent as information from a line device 12. OAM cells are maintenance operation and control cells that notify of information needed for checking whether transmission lines and exchange equipment are operating normally, and for checking for cell loss or erroneous delivery. The OAM controller 14 also performs the functions of compiling OAM cells, based on directions from the call controller 18, and sending them to the line devices 12.

The signal controller 15 receives signal line impairment information from the signal terminal device 13 and makes information of signal line impairment occurrences to the call controller 18. It also receives signal line restoration information from the signal terminal device 13 and notifies the call controller 18 of signal line restoration.

The call route controller 16 receives requests from the call controller to establish or release paths, and in turn requests the switch 11 and the line devices 12 to establish or release paths.

The protocol controller 17 analyzes messages contained in signal cells sent as information from the signal terminal device 13 and communicates the particulars of these analyses to the call controller 18. Also, when it receives a message sending request from the call controller 18, the protocol controller 17 edits the message and sends it to the signal terminal device 13.

The call controller 18 receives requests to establish or release paths, that are messages sent as information from the protocol controller 17, and then directs the call route controller 16 to establish or release paths. When it receives information of signal line impairment from the signal controller 15, moreover, it decides whether or not to preserve the path. It also sends requests to the OAM controller 14 to send CAM cells.

The ATM switch 10 comprises a memory (MM) 20 for storing various kinds of data such as the call processing data and subscriber data needed by the call controller 18 for call control.

In this embodiment of the present invention, furthermore, the ATM switch 10 that performs path establishing, path releasing, and other call controls, as described in the foregoing, also performs controls to preserve established paths when an impairment has occurred in a signal line. In the first through eighth embodiments of the present invention described herein, moreover, it is assumed that an impairment has occurred in the signal line between the subscriber device 1A and the ATM switch 10. Also, the subscriber device 1A will be referred to simply as subscriber device 1.

Figure 2:
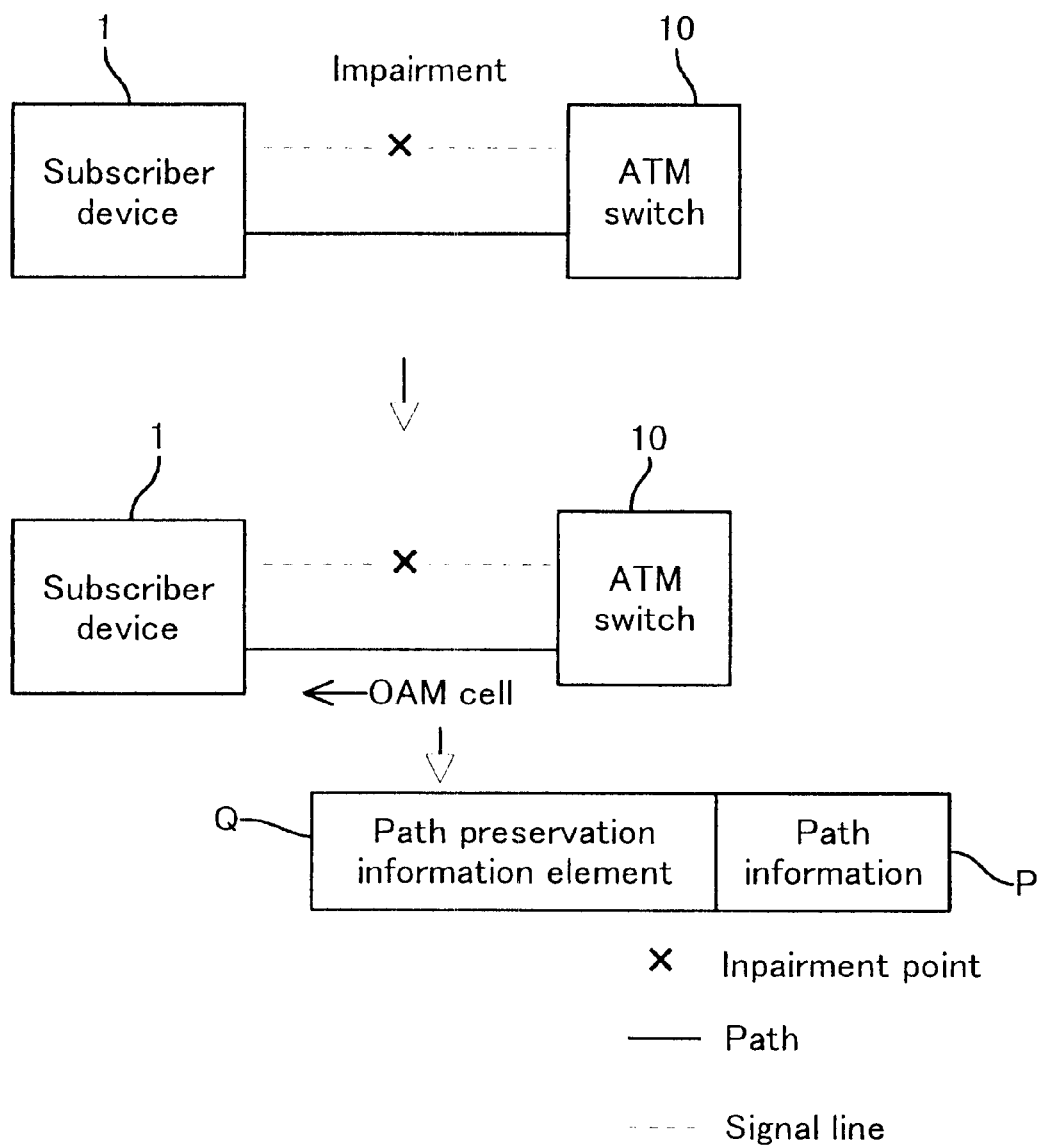
FIG. 2 is a diagram for explaining path preservation control in a first embodiment of the present invention.
Figure 3:
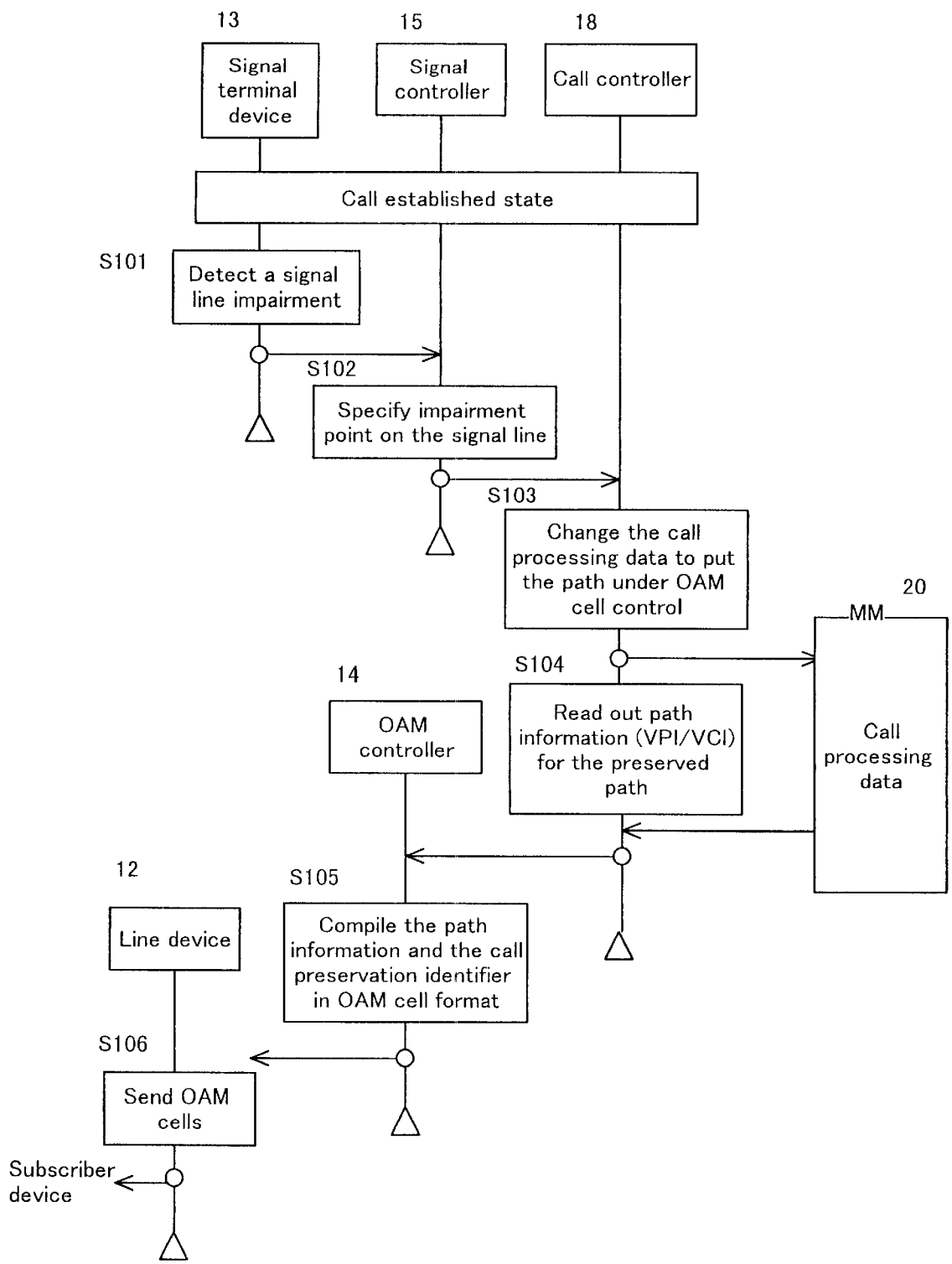
FIG. 3 is a processing flowchart for the first embodiment of the present invention.

FIG. 2 is a diagram for explaining path preservation control in a first embodiment of the present invention. FIG. 3 is a processing flowchart for this first embodiment. In FIG. 2(a), when an impairment has occurred in the signal line between the subscriber device 1 and the ATM switch 10, the ATM switch 10 does not release the path established between it and the subscriber device 1.

Furthermore, in FIG. 2(b), the ATM switch 10 sends an OAM cell notifying that the path has been preserved over the path to the subscriber device 1. This OAM cell comprises the preserved path information P, that is, a virtual path identifier (VPI) and a virtual channel identifier (VCI), together with a path preservation information element Q that contains the information that the path has been preserved.

The first embodiment will now be described in greater detail, making reference to FIG. 3. In a call established state wherein a call has already been established, the signal terminal device 13 of the ATM switch 10 in FIG. 1 detects a signal line impairment (step S101). When the signal controller 15 is communicated of the signal line impairment, the signal controller 15 specifies the impairment point on the signal line where the impairment occurred (step S102). When the call controller 18 is communicated of the signal line impairment, the call controller 18 changes and sets the call processing data in the memory 20 so that the path controlled by the signal line on which the impairment has occurred is put under OAM cell control (step S103).

Then the call controller 18 reads out the path information for the preserved path, that is, the virtual path (VP) and virtual channel (VC), from the call processing data (step S104), and communicates that path information and a call preservation identifier that contains information to preserve that path to the OAM controller 14.

The OAM controller 14 takes the path information and the call preservation identifier communicated from the call controller 18 and compiles them in an OAM cell format (step S105). Then it communicates this compiled OAM cell format to the line device 12. The line device 12, then, sends them as OAM cells to the subscriber device 1 (step S106).

Figure 4A:
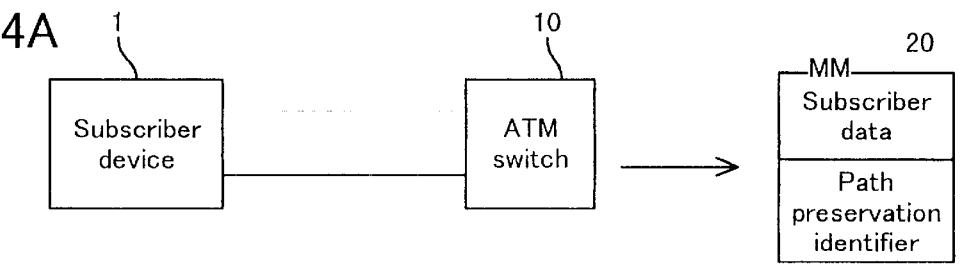
FIG. 4 is a diagram for explaining path preservation control in a second embodiment of the present invention.

FIG. 4 is a diagram for explaining path preservation control in a second embodiment of the present invention. FIG. 5 is a processing flowchart for this second embodiment. In FIG. 4(a), a path preservation identifier is set in the subscriber data in the memory (MM) 20 of the ATM switch 10 when an impairment has developed in the signal line between the subscriber device 1 and the ATM switch 10. This path preservation identifier contains information on whether or not to preserve the path with that subscriber device 1. The path preservation identifier may be a flag, for example. If this flag is set to "1", then "preservation" is designated. If it is set to "0", then "release" is designated. The setting of the path preservation identifier is performed beforehand by a maintenance terminal (not shown) or the like.

Figure 4B:
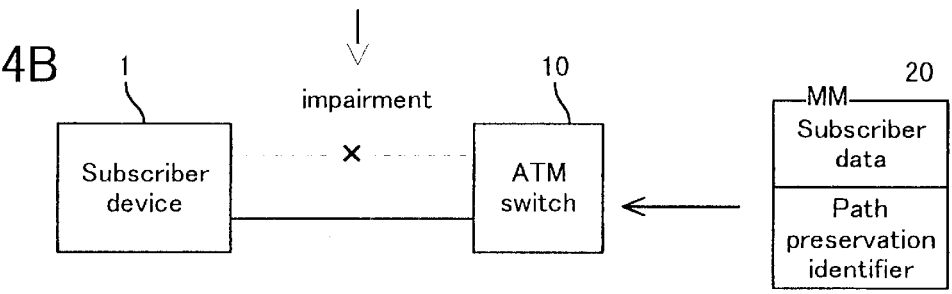
Figure 4C:
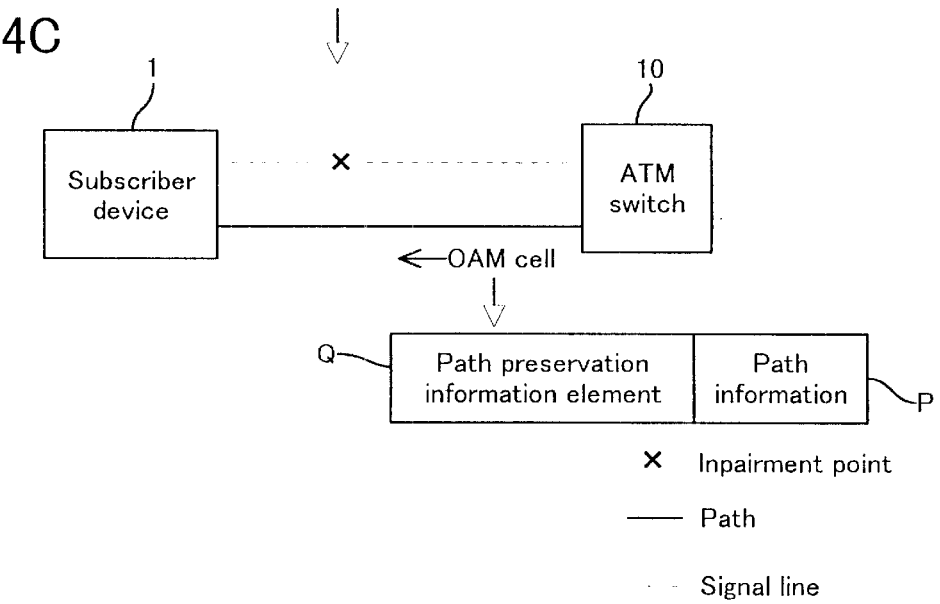
Figure 5:
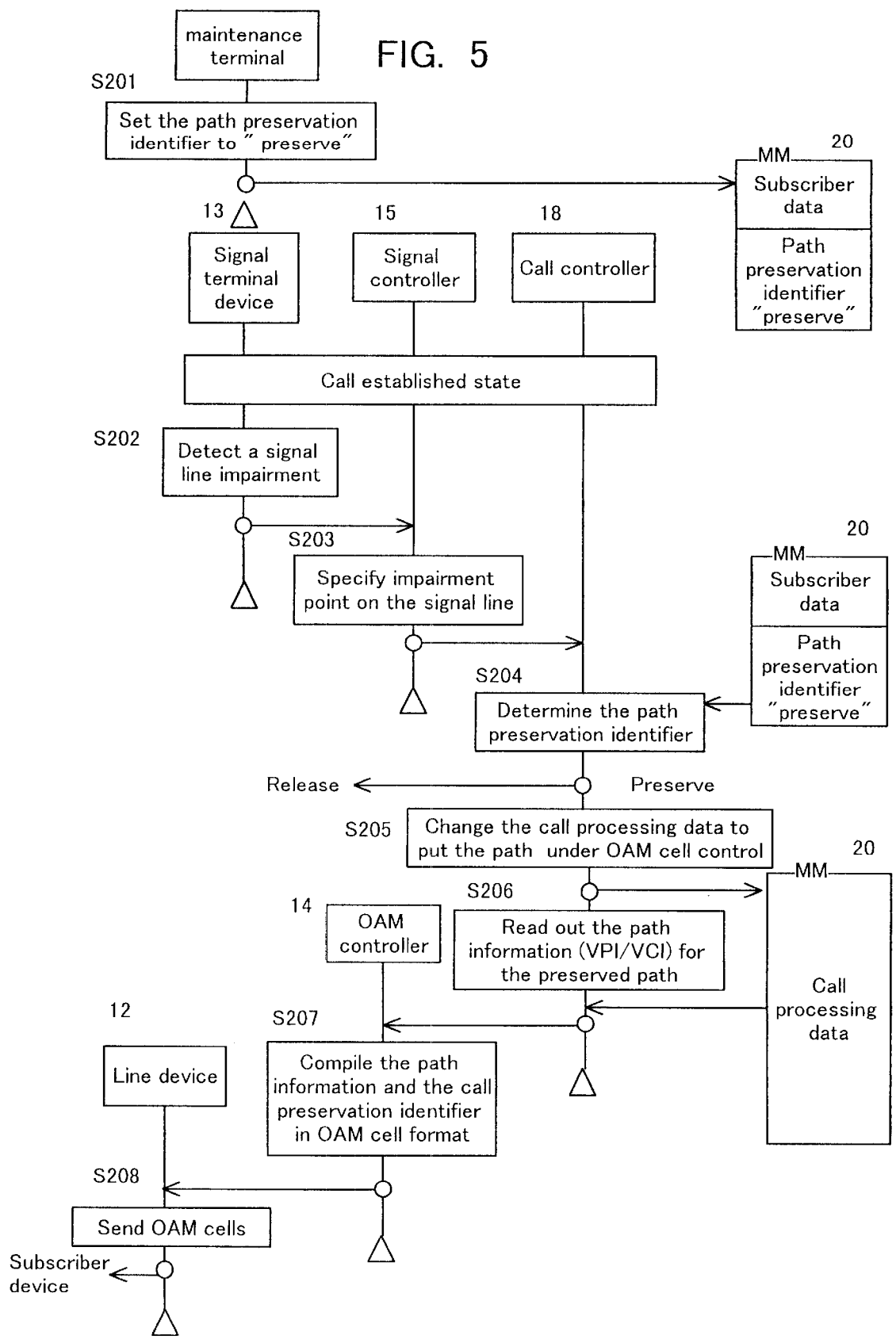
FIG. 5 is a processing flowchart for the second embodiment of the present invention.

In FIG. 4(b), when an impairment has occurred in the signal line between the subscriber device 1 and the ATM switch 10, the ATM switch 10 reads out from the memory 20 the path preservation identifier of the subscriber data corresponding to the subscriber device 1 at issue. If the path preservation identifier so read out indicates "preservation," then the ATM switch 10 does not release the path established with the subscriber device 1. In FIG. 4(c), the ATM switch 10 sends a message by OAM cell to the effect that the path has been preserved to the subscriber device 1 over the path. The OAM cell comprises the path information P and the path preservation information element Q, as described earlier.

The second embodiment will now be described in greater detail, making reference to FIG. 5. A path preservation identifier, with which is determined the path control for cases where an impairment has developed in the signal line, has already been set beforehand to "preserve," using a maintenance terminal (step S201). The path preservation identifier so established is recorded as subscriber data in the memory 20 of the ATM switch 10.

Then, in a call established state wherein a call has already been established, the signal terminal device 13 detects a signal line impairment (step S202). When the signal line impairment is communicated to the signal controller 15, the signal controller 15 specifies the impairment point on the signal line where the impairment occurred (step S203). Then, when the call controller 18 is communicated of the signal line impairment, the call controller 18 reads the subscriber data out of the memory 20, and determines the path preservation identifier (step S204). The case where the path preservation identifier indicates "release" will be discussed subsequently. When the path preservation identifier indicates "preserve," the call controller 18 changes and sets the call processing data in the memory 20 so that the path that the impaired signal line had been controlling is placed under OAM cell control (step S205).

Then, the call controller 18 reads the path information for the path being preserved from the subscriber data, that is, it reads the virtual path identifier (VPI) and the virtual channel identifier (VCI), etc. (step S206), and communicates that path information together with a call preservation identifier containing information to preserve that path to the OAM controller 14.

The OAM controller 14 takes the path information and the call preservation identifier communicated from the call controller 18 and compiles them in an OAM cell format (step S207). Then, the line device 12 sends them as OAM cells to the subscriber device 1 (step S208).

Figure 8:
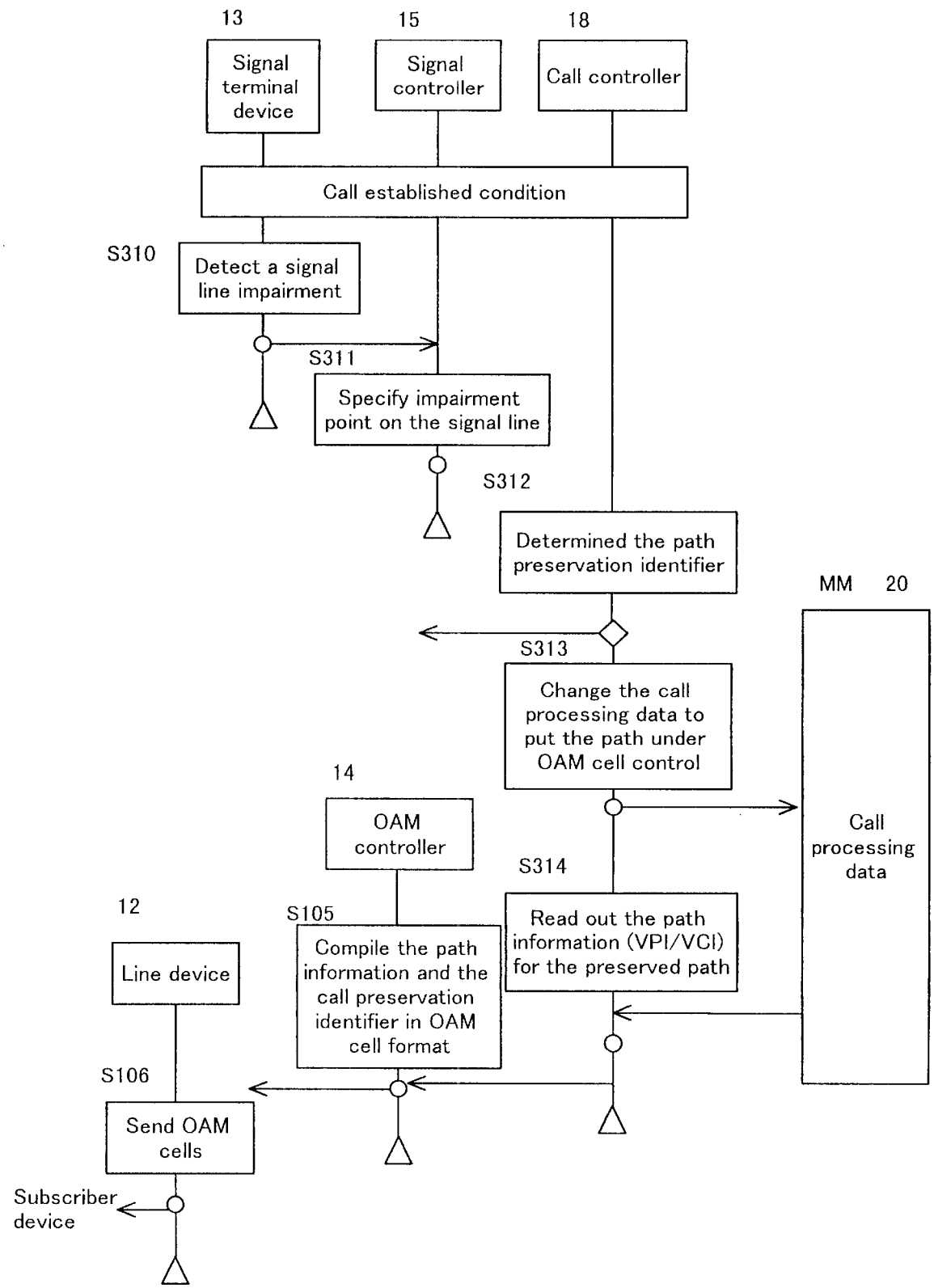
FIG. 8 is a processing flowchart (2 of 2) for the third embodiment of the present invention.

FIG. 6 is a diagram for explaining path preservation control in a third embodiment of the present invention. FIG. 7 and 8 are processing flowcharts for this third embodiment.

Figure 6A:
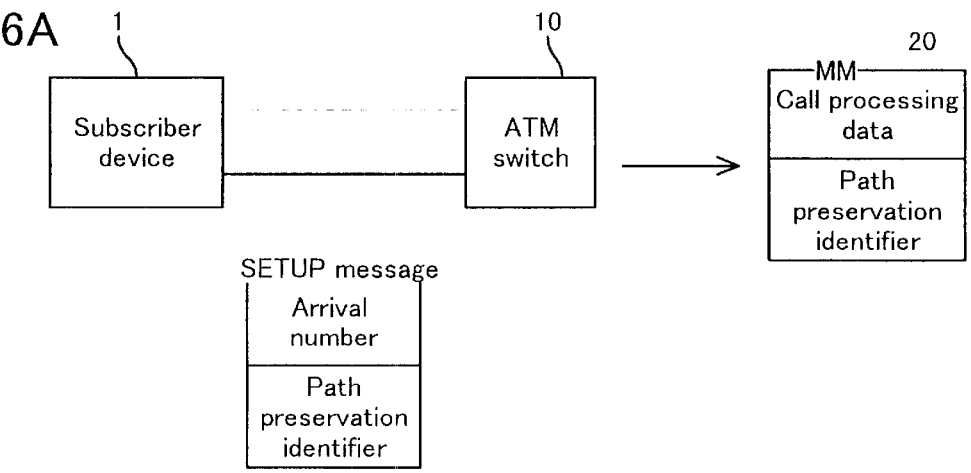
FIG. 6 is a diagram for explaining path preservation control in a third embodiment of the present invention.

In FIG. 6(a), an arrival number, etc., and a path preservation identifier are established in a call establishment message (SETUP message) sent from the subscriber device 1 when a request is made for call establishment. The ATM switch 10 takes the path preservation identifier contained in the received SETUP message and stores it as call processing data in the memory 20.

Figure 6B:
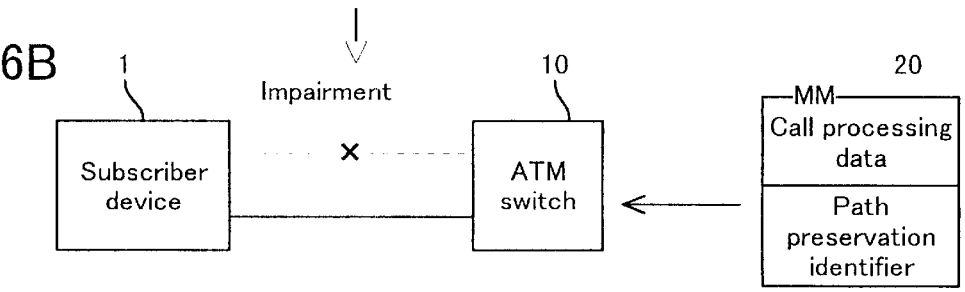
Figure 6C:
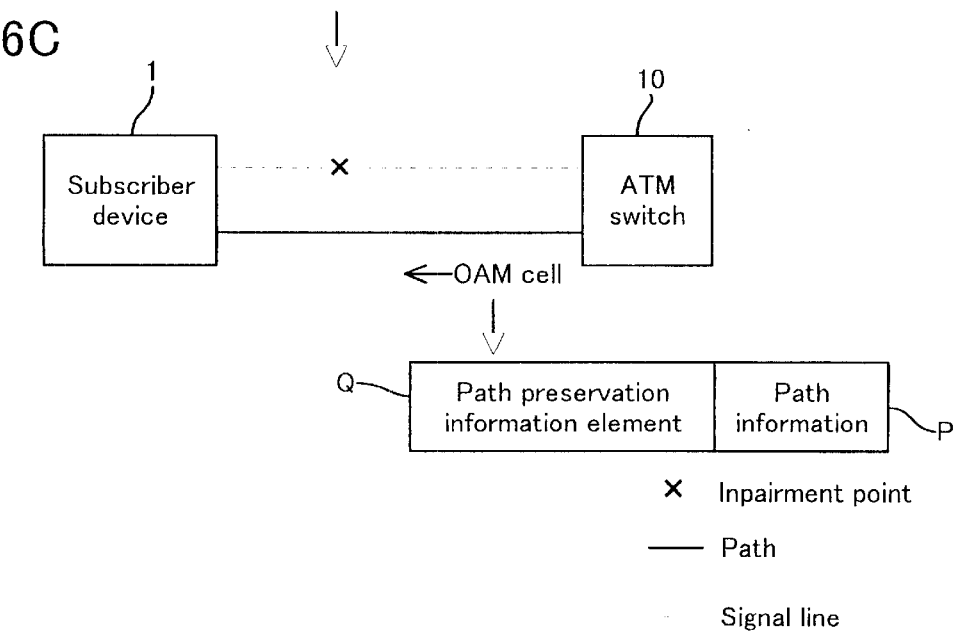

In FIG. 6(b), when an impairment has developed in the signal line between the subscriber device 1 and the ATM switch 10, if the path preservation identifier is referenced, and that path preservation identifier indicates "preserve," the path is not released but is preserved unchanged. In FIG. 6(c), an OAM cell comprising path information P and a path preservation identifier Q is communicated to the subscriber device 1.

The third embodiment is now described in greater detail, making reference to FIG. 7 and 8. FIG. 7 is a processing flowchart for establishing calls between the subscriber device 1 and the ATM switch 10. When a call establishment message is sent as a signal cell from the subscriber device 1, the signal terminal device 13 extracts the message from the signal cell (step S301). The extracted message is communicated to the protocol controller 17 where it is analyzed (step S302). The analyzed message is then communicated to the call controller 18, and various kinds of information, such as the call establishment information, path information, and path preservation identifier, are stored in the call processing data in the memory 20 (step S303).

The call route controller 16 makes a path establishment request to a line device 12 based on the path information contained in the message (step S304). The line device 12 establishes the path according to the path establishment request from the call route controller 16, and immediately establishes a call (step S305).

When call establishment is complete, the call controller 18 informs the protocol controller 17 that call establishment is complete (step S306), and the protocol controller 17 compiles a call establishment completion message (step S307) which it sends to the signal terminal device 13. The signal terminal device 13 converts the call establishment completion message to a signal cell (step S308), and sends it to the subscriber device 1. This results in a call established state.

FIG. 8 is a path preservation control flowchart for the third embodiment. In FIG. 8, in the call established state wherein a call has been established, the signal terminal device 13 detects a signal line impairment (step S310). When this signal line impairment is communicated to the signal controller 15, the signal controller 15 specifies the impairment point on the signal line wherein the impairment has occurred (step S311). Then, when the signal line impairment is communicated to the call controller 18, the call controller 18 reads the call processing data out of the memory 20, and determines a path preservation identifier (step S312). The case where the path preservation identifier is "release" is discussed later. When the path preservation identifier is "preserve," the call controller 18 changes and sets call processing data in the memory 20 so that the path which was being controlled by the signal line on which the impairment occurred is placed under OAM cell control (step S313).

Then the call controller 18 reads the path information for the path being preserved out of the call processing data, that is, it reads the virtual path identifier (VPI) and the virtual channel identifier (VCI) (step S314), and communicates this path information together with a call preservation identifier that contains information for preserving that path to the OAM controller 14.

The OAM controller 14 takes the path information and the call preservation identifier communicated from the call controller 18 and compiles them into an OAM cell format (step S315). Then, the line device 12 sends them as OAM cells to the subscriber device 1 (step S316).

Figure 9A:
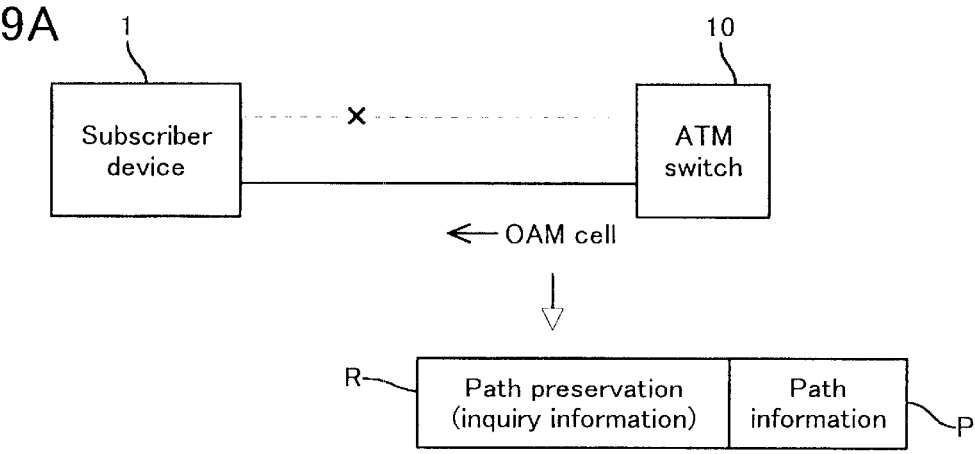
FIG. 9 is a diagram for explaining path preservation control in a fourth embodiment of the present invention.
Figure 9B:
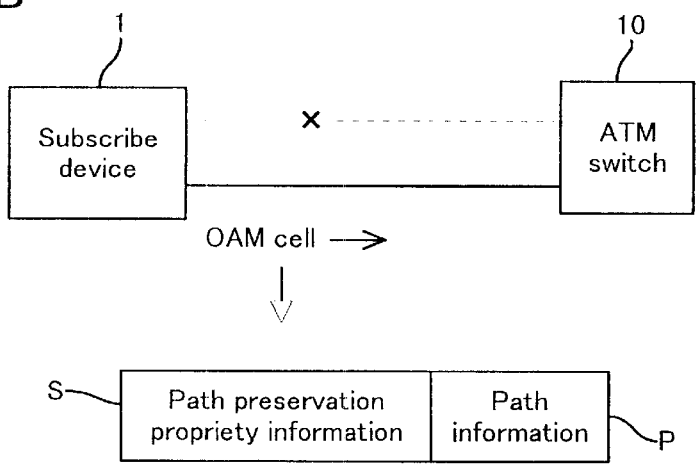

FIG. 9 is a diagram for explaining path preservation control in a fourth embodiment of the present invention. FIG. 10 is a processing flowchart for the fourth embodiment. In FIG. 9(a), when an impairment has occurred in a signal line between the subscriber device 1 and the ATM switch 10, the ATM switch 10 sends an OAM cell to the subscriber device 1 to inquire whether or not to preserve the path established with the subscriber device 1. The OAM cell comprises the path information P and the path preservation inquiry information R that makes the path preservation inquiry. In FIG. 9(b), the subscriber device 1, having received an OAM cell from the ATM switch 10, makes information by means of an OAM cell whether or not to preserve the path. This OAM cell contains the path information P and the path preservation propriety information. Then, if the path preservation propriety information contained in the OAM cell sent from the subscriber device 1 is "preserve," the ATM switch 10 does not release the path but preserves it without change.

The fourth embodiment is now described in greater detail, making reference to FIG. 10. In the call established state wherein a call has been established, the signal terminal device 13 detects a signal line impairment (step S401). When the signal line impairment is communicated to the signal controller 15, the signal controller 15 specifies the impairment point on the signal line wherein the impairment occurred (step S402). Then the call controller 18 reads the path information (VP and VC) for the impaired signal line from the call processing data in the memory 210 (step S403).

The path information is communicated to the OAM controller 14, and an OAM cell format containing the path preservation inquiry information is compiled (step S404). The compiled OAM cell format is then communicated to the line device 12. The line device 12, in turn, sends the OAM cell format as an OAM cell to the subscriber device 1 (step S405).

When an OAM cell containing the path preservation propriety information is sent from the subscriber device 1, the line device 12 extracts the message from that OAM cells (step S406), after which the OAM controller 14 analyzes the message(step S407). The call controller 18 then determines the path preservation propriety information (step S408). The case where the path preservation propriety information is "release" will be discussed subsequently. When the path preservation propriety information is "preserve," the call controller 18 preserves the path intact, and sets path preservation in the call processing data (step S409).

Figure 11A:
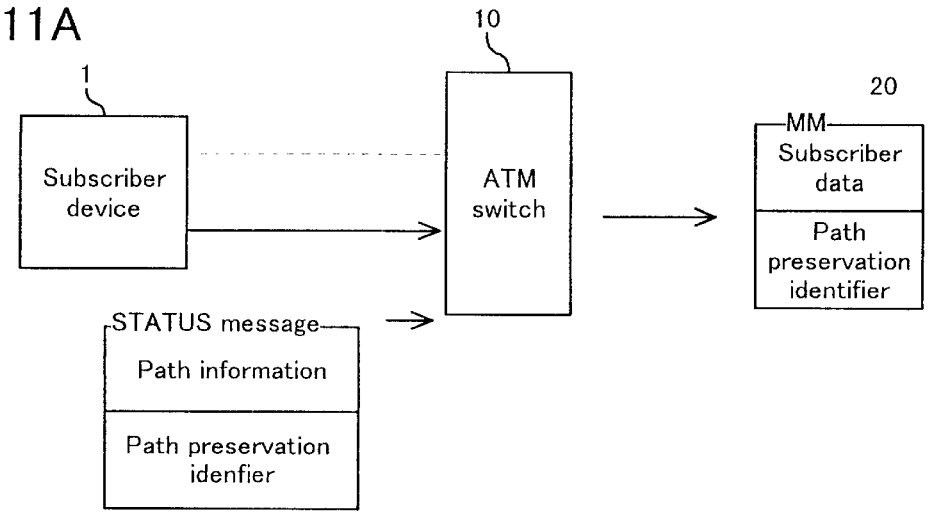
FIG. 11 is a diagram for explaining path preservation control in a fifth embodiment of the present invention.
Figure 13:
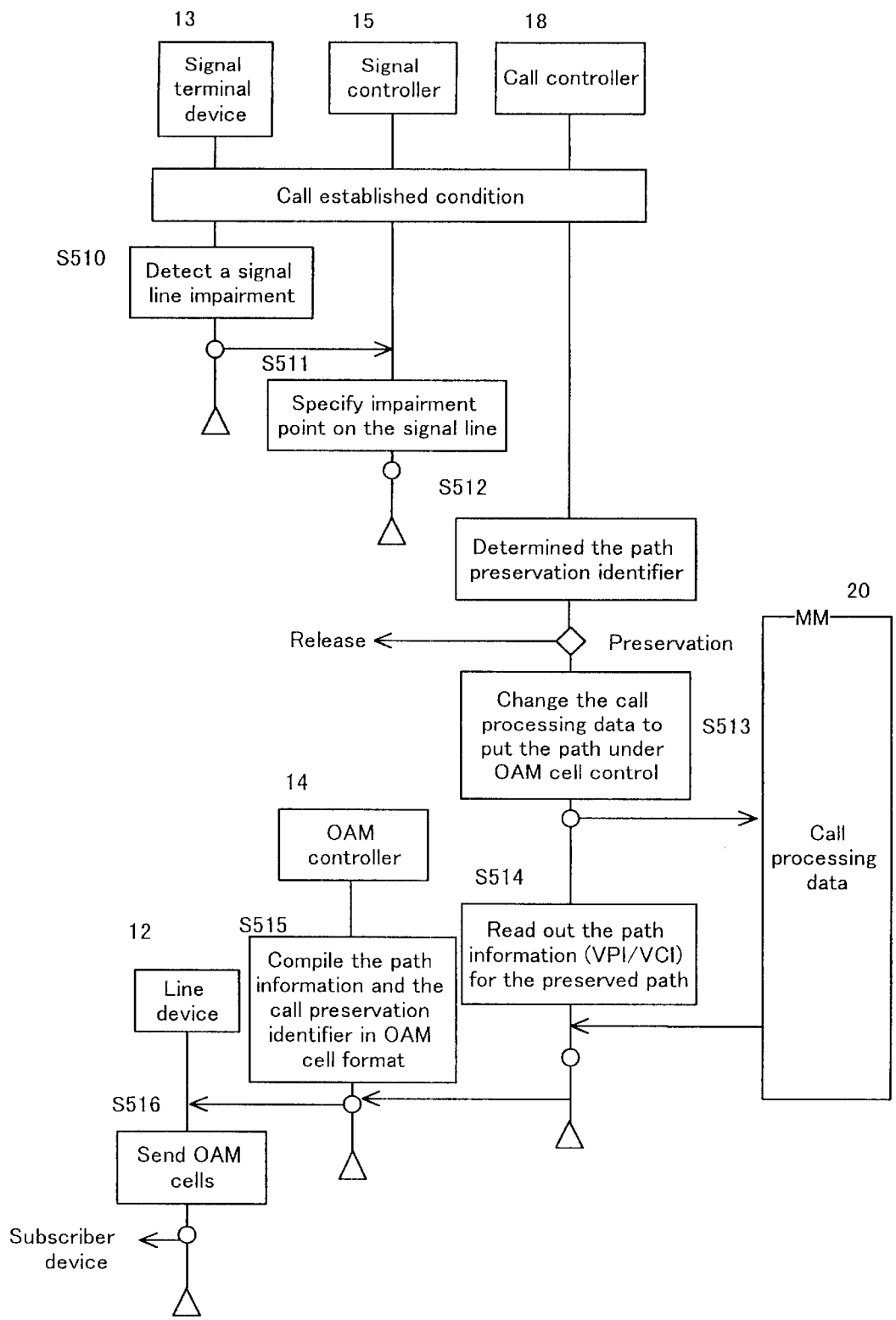
FIG. 13 is a processing flowchart (2 of 2) for the fifth embodiment of the present invention.

FIG. 11 is a diagram for explaining path preservation control in a fifth embodiment of the present invention. FIG. 12 and 13 are processing flowcharts for the fifth embodiment. In FIG. 11(a), in a state wherein a call has been established between the subscriber device 1 and the ATM switch 10, a call state verification (STATUS) message is sent from the subscriber device 1. This STATUS message contains path information and a path preservation identifier. The ATM switch 10, having received the STATUS message, stores the path preservation identifier in the call processing data in the memory 20.

Figure 11B:
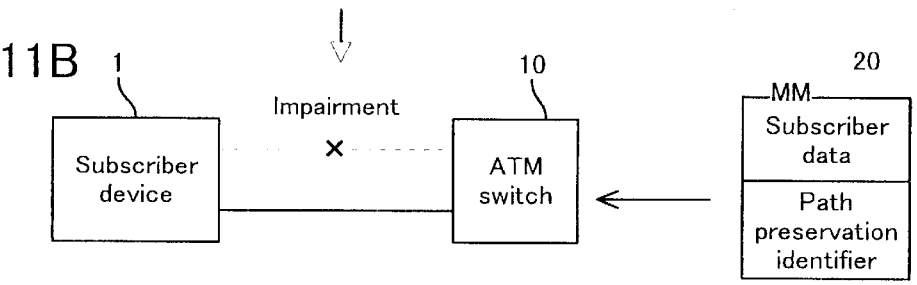
Figure 11C:
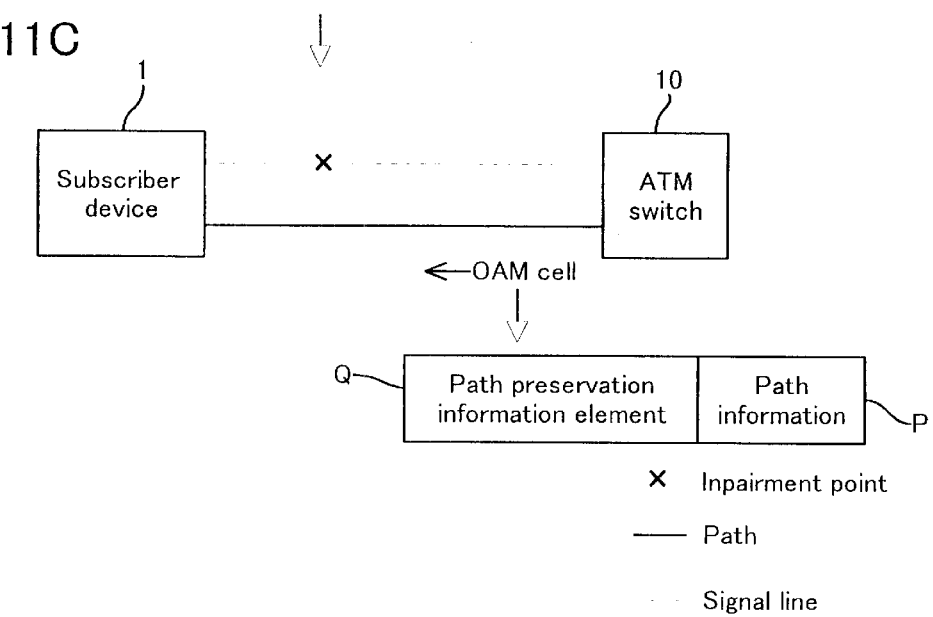

In FIG. 11(b), when the path preservation identifier is set to "preserve," and an impairment occurs in the signal line between the subscriber device 1 and the ATM switch 10, the ATM switch 10 reads out of the memory 20 the path preservation identifier of the call processing data corresponding to the subscriber device 1 at issue. Because the path preservation identifier read out is "preserve," the ATM switch 10 does not release the path established with the subscriber device 1. In FIG. 11(c), the ATM switch 10 sends an OAM cell over the path to inform the subscriber device 1 that the path has been preserved. The OAM cell comprises path information P and the path preservation information element Q, as described earlier.

The fifth embodiment is now described in greater detail, making reference to FIGS. 12 and 13. FIG. 12 is a flowchart for establishing a path preservation identifier with a call state verification message. In FIG. 12, when a call state verification message is sent from the subscriber device 1 as a signal cell, the signal terminal device 13 extracts the message from the signal cell (step S501). The extracted message is analyzed in the protocol controller 17 (step S502). Then the call controller 18 stores the path preservation identifier contained in the message in the call processing data in the memory 20 (step S503).

FIG. 13 is a path preservation control flowchart for the fifth embodiment. In FIG. 13, in a call established state wherein a call has been established, the signal terminal device 13 detects a signal line impairment (step S510). When this signal line impairment is communicated to the signal controller 15, the signal controller 15 specifies the impairment point on the signal line wherein the impairment occurred (step S511). Then, when the signal line impairment is communicated to the call controller 18, the call controller 18 reads the call processing data from the memory 20, and determines a path preservation identifier (step S512). Cases wherein the path preservation identifier is "release" will be discussed subsequently. When the path preservation identifier is "preserve," the call controller 18 changes and sets the call processing data so that the path that was being controlled by the impaired signal line will be put under OAM cell control (step S513).

The call controller 18 reads out the path information for the path being preserved from the call processing data, that is, it reads out the virtual path identifier (VPI) and the virtual channel identifier (VCI) (step S514), and communicates a call preservation identifier that contains the information to preserve this path to the OAM controller 14.

The OAM controller 14 takes the path information and call preservation identifier communicated from the call controller 18 and compiles them in an OAM cell format (step S515). Then, the line device 12 sends them as OAM cells to the subscriber device 1 (step S516).

Figure 14A:
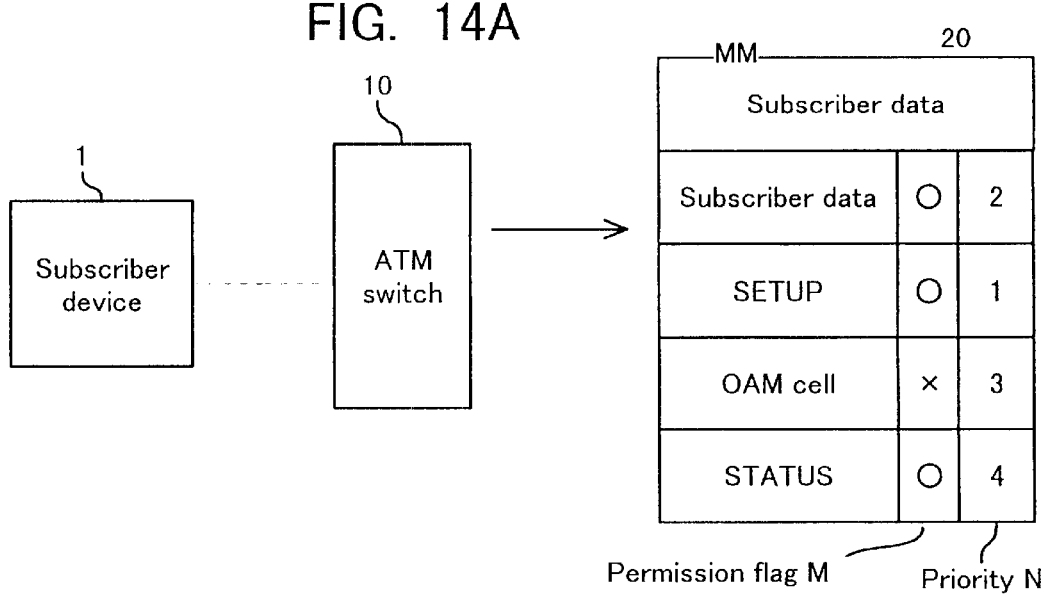
FIG. 14 is a diagram for explaining path preservation control in a sixth embodiment of the present invention.
Figure 15:
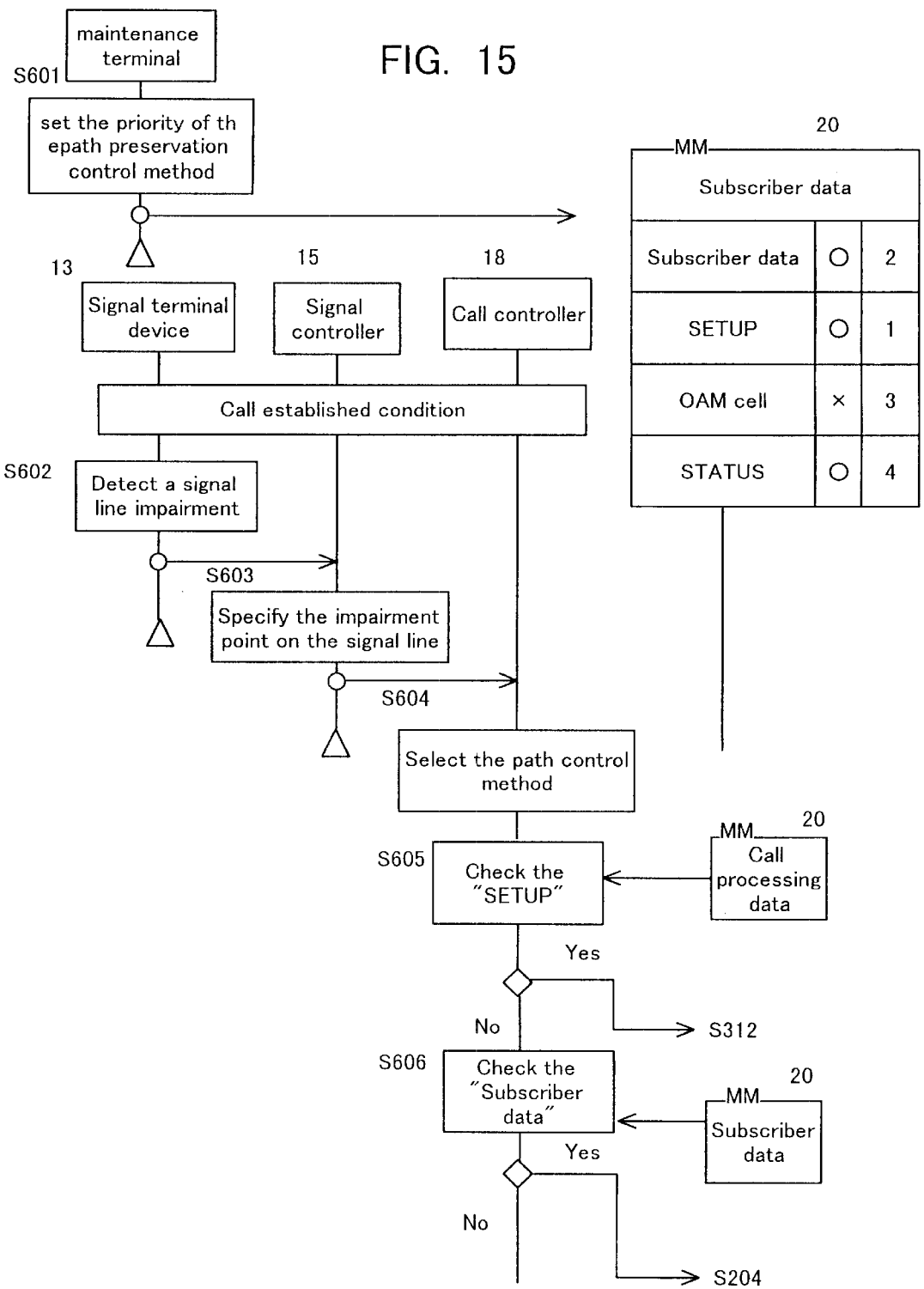
FIG. 15 is a processing flowchart (1 of 2) for the sixth embodiment of the present invention.
Figure 16:
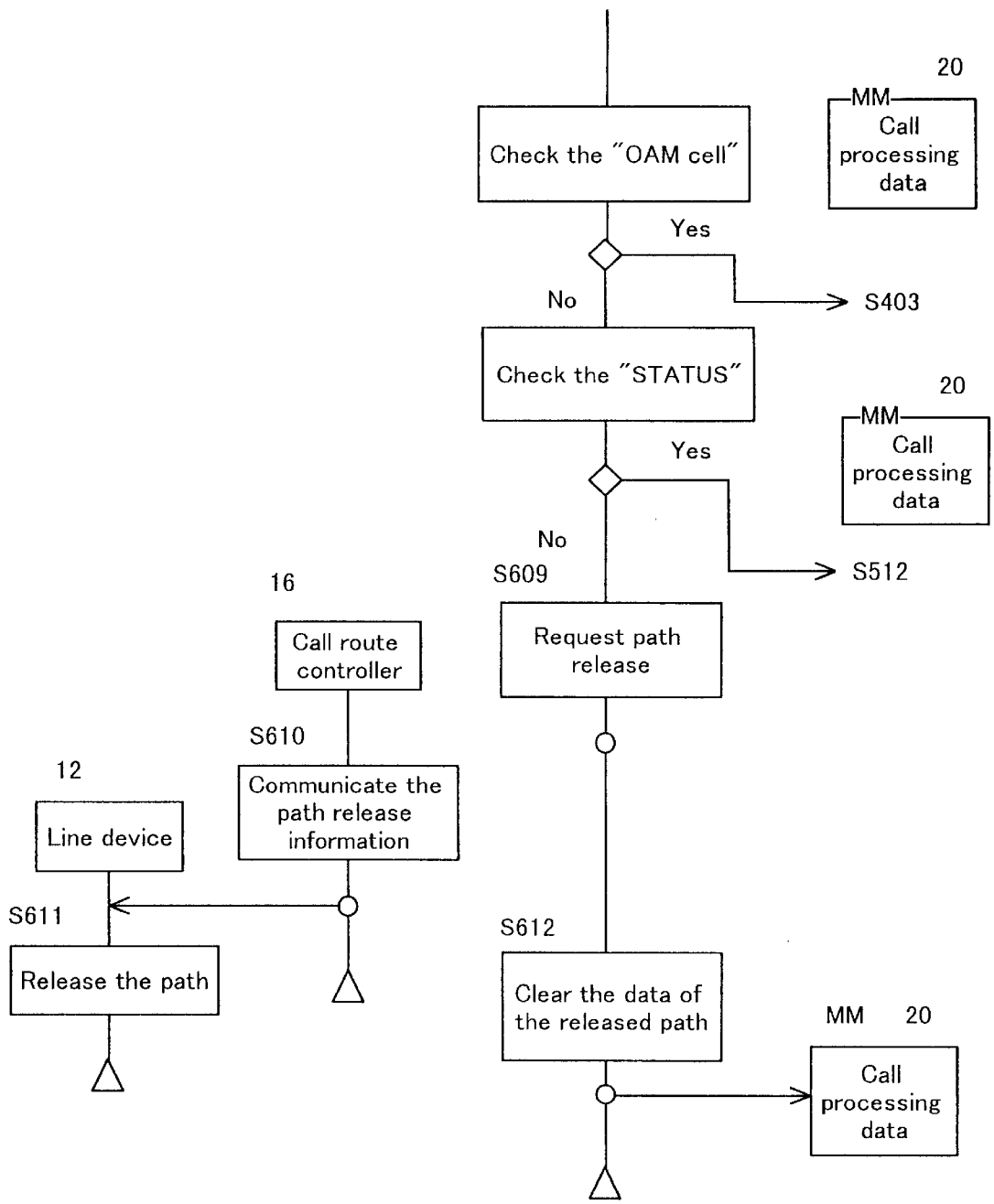
FIG. 16 is a processing flowchart (2 of 2) for the sixth embodiment of the present invention.

FIG. 14 is a diagram for explaining path preservation control in a sixth embodiment of the present invention. FIG. 15 and 16 are processing flowcharts for the sixth embodiment. In FIG. 14, a permission flag M for selecting path preservation control from among the second through fifth embodiments noted above, when an impairment has occurred in a signal line, and a priority N for making the selection, are set in the subscriber data, the second embodiment is called the "subscriber data" method, the path preservation control method in the third embodiment is called the "call establishment message" method, the path preservation control method in the fourth embodiment is called the "maintenance operation cell (OAM) cell" method, and the path preservation control method in the fifth embodiment is called the "call state verification message" method.

Figure 14B:
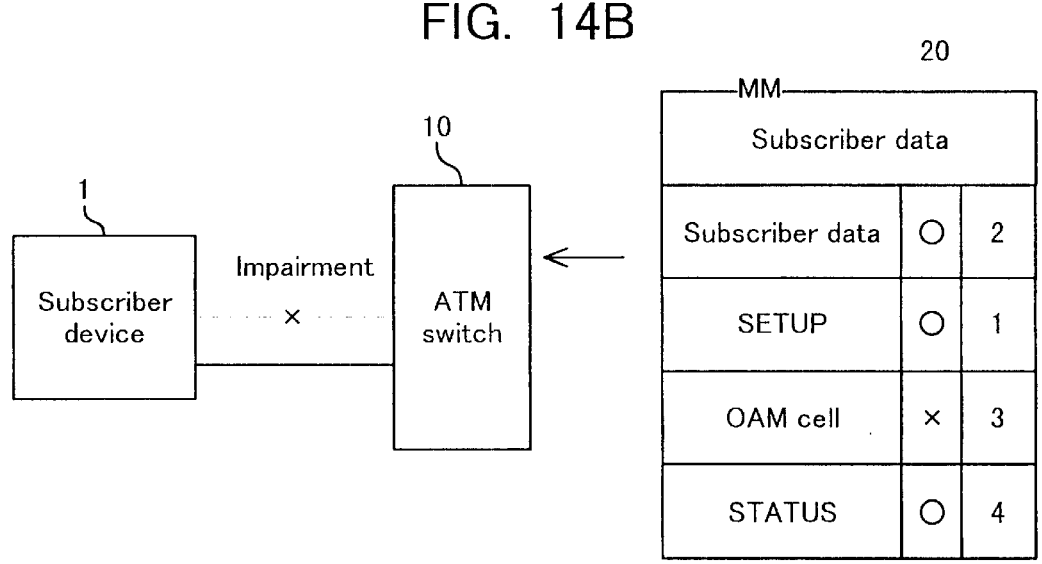

In FIG. 14(b), when an impairment has occurred in a signal line, that path preservation control method is selected which has the highest priority and for which the permission flag is "permitted." However, if no path preservation identifier corresponding to the path preservation control method selected is stored in the memory 20, then that path preservation control method is selected which has the next highest priority and for which the permission flag is "permitted." In FIG. 14, the symbol ○ indicates that the permission flag is in the "permitted" state, while the symbol X indicates that the permission flag is in the "not permitted" state.

The sixth embodiment is now described in greater detail, making reference to FIGS. 15 and 16. In FIG. 15, a maintenance terminal (not shown) is used to set the permission flag that either does or does not permit the selection of the path preservation control methods noted above, and the priority for making those selections, as part of the subscriber data in the memory 20 (step S601). Let it be assumed here that priority 1 is the "SETUP message" method, that priority 2 is the "subscriber data" method, that priority 3 is the "OAM cell" method, and that priority 4 is the "STATUS message" method. Let it be further assumed that the permission flag is set to "permitted" for the "SETUP message" method, "subscriber data" method, and "STATUS message" method, but to "not permitted" for the "OAM cell" method.

In the call established state wherein a call has been established, the signal terminal device 13 detects a signal line impairment (step S602). When this signal line impairment is communicated to the signal controller 15, the signal controller 15 specifies the impairment point on the signal line wherein the impairment has occurred (step S603). Then the call controller 18 selects a path preservation control method according to the priorities set in the subscriber data in the memory 20 (step S604).

First, since priority 1 is the "SETUP message" method, the permission flag corresponding to the "SETUP message" method is checked, and if it is "permitted," then a verification is made to see whether or not a path preservation identifier is set in the call processing data (step S605).

If a path preservation identifier has been set, the third embodiment is executed from step S312 in FIG. 8. If, on the other hand, either the permission flag is "not permitted," or no path preservation identifier is set, then the permission flag corresponding to the "subscriber data" method—which is the path preservation control method having the next highest priority—is checked and, if it is "permitted," then a verification is made to see whether the path preservation identifier is set in the subscriber data (step S606).

When a path preservation identifier is set, the second embodiment is executed from step S204 in FIG. 5. If, on the other hand, the permission flag is "not permitted," or if no path preservation identifier is set, then step S607 in FIG. 16 is advanced to, and the permission flag corresponding to the "OAM cell" method—which is the path preservation control method having the next highest priority—is checked.

If the permission flag is "permitted," then the fourth embodiment is executed from step S403 in FIG. 10. If, on the other hand, the permission flag is "not permitted," then the permission flag corresponding to the "STATUS message" method—which is the path preservation control method having the next highest priority—is checked and, if it is "permitted," then a verification is made to see whether the path preservation identifier is set in the call processing data (step S608).

If the path preservation identifier is set, then the fifth embodiment is executed from step S512 in FIG. 13. If, on the other hand, the permission flag is "not permitted," or if the path preservation identifier is not set, then it is deemed that none of the path preservation control methods have been selected, and the call release process is executed.

In other words, in step S609, the call controller 18 communicates a path release request to the call route controller 16. Thereupon, based on this path release request, the call route controller 16 communicates path release information to the line device 12 (step S610). The line device 12 releases the path in response to the path release information from the call route controller 16, that is, it performs a call release (step S611). When the call release is completed, the call controller 18 clears the call processing data corresponding to the released path in the memory 20 (step S612).

Figure 18:
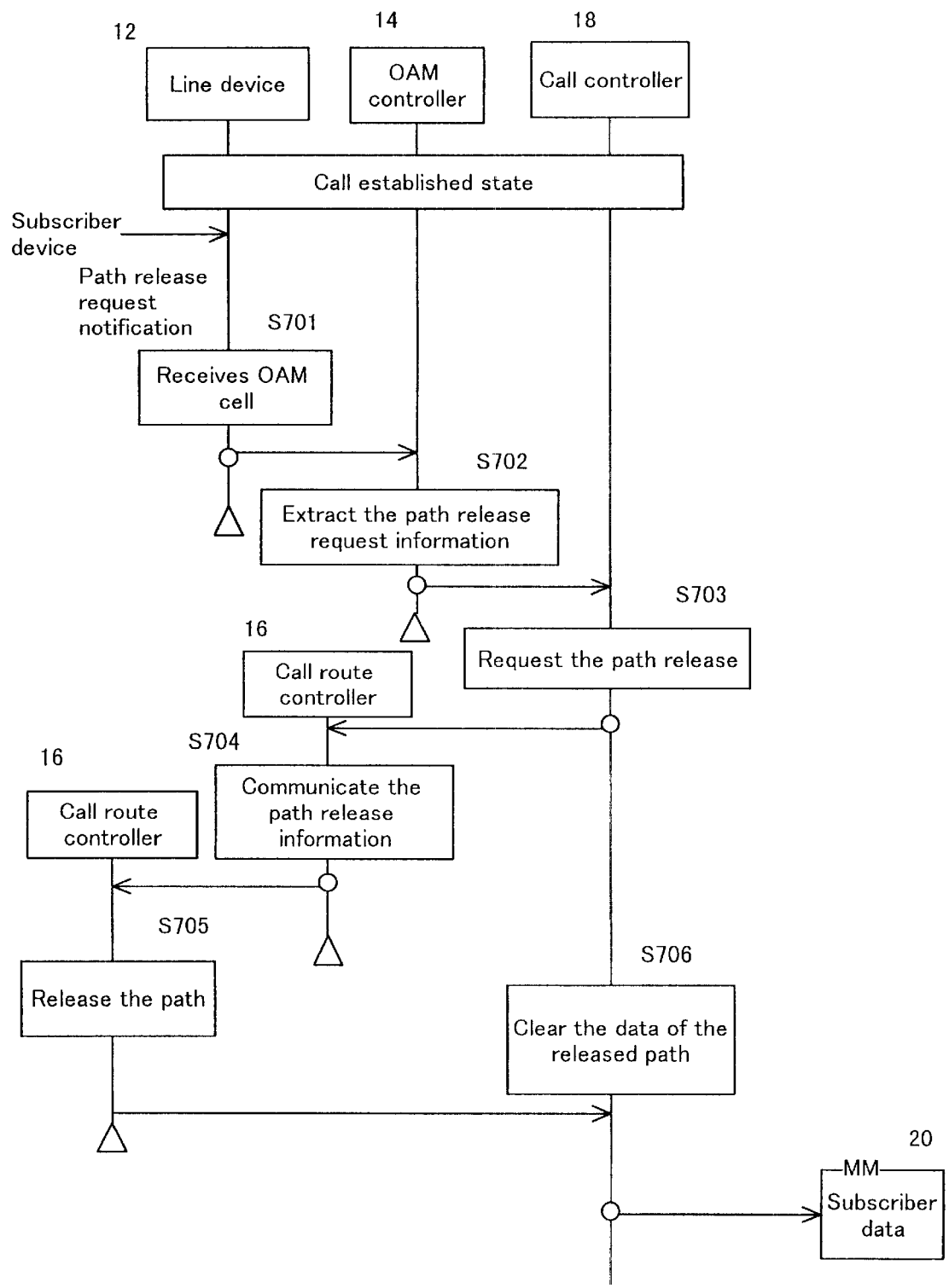
FIG. 18 is a processing flowchart (1 of 2) for the seventh embodiment of the present invention.
Figure 19:
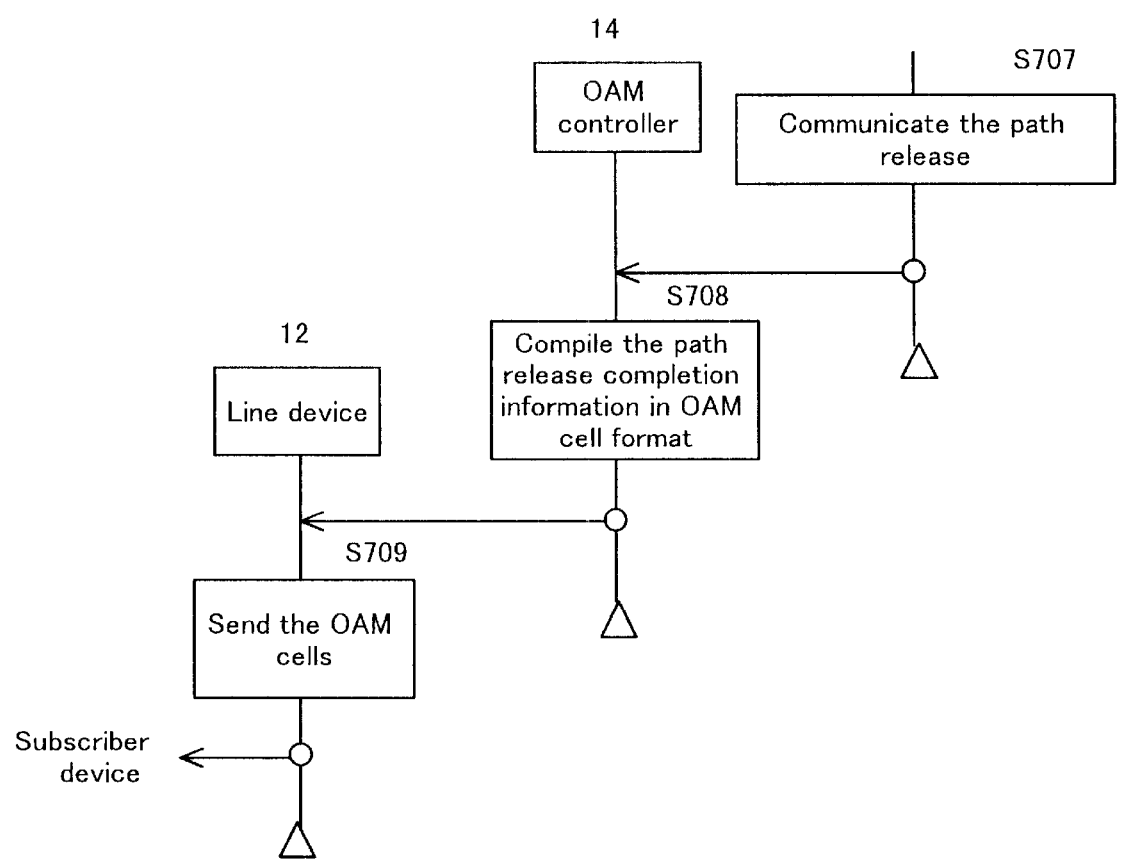
FIG. 19 is a processing flowchart (2 of 2) for the seventh embodiment o:f the present invention.

FIG. 17 is a diagram for explaining path release control when a path is preserved during an impairment to a signal line, which is a seventh embodiment of the present invention. FIGS. 18 and 19 are processing flowcharts for this seventh embodiment. When things are normal, path release request information and path release completion information are sent over signal lines. In the embodiments described in the foregoing, however, a signal line cannot be so used, when a path has been preserved even though an impairment has occurred in a signal line.

Figure 17A:
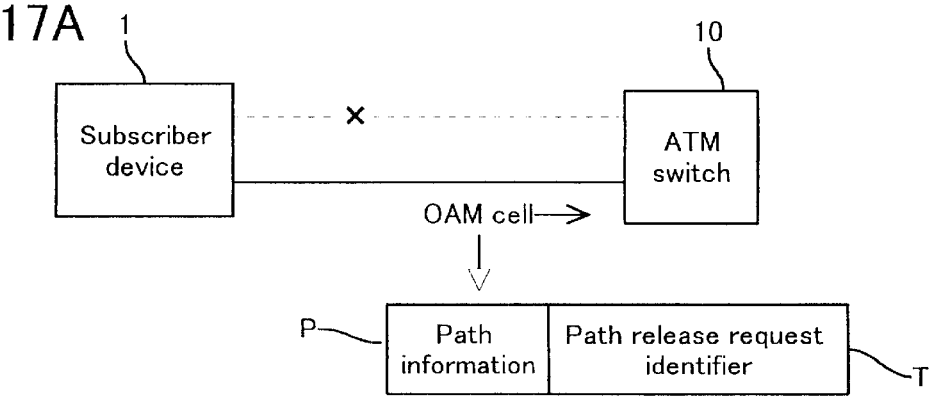
FIG. 17 is a diagram for explaining path preservation control in a seventh embodiment of the present invention.

This being so, in FIG. 17(a), the subscriber device 1 sends an OAM cell that is the path release request information containing path information P for the path being preserved and the path release request identifier T, to the ATM switch 10 via the path.

Figure 17B:
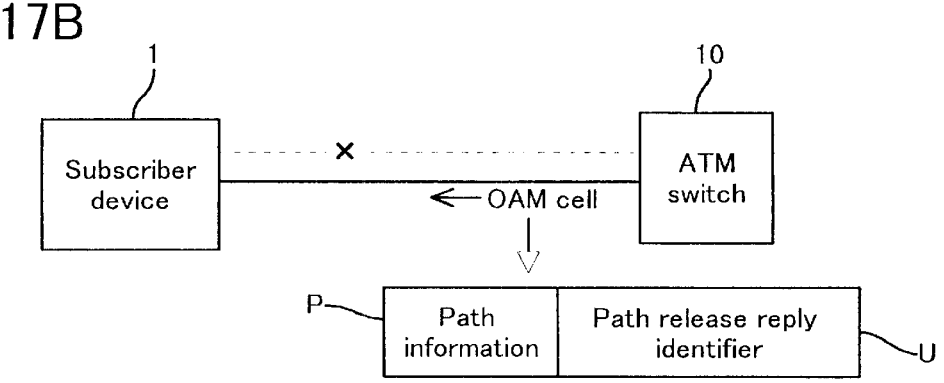

In FIG. 17(b), the ATM switch 10, having received an OAM cell containing a path release request identifier, performs path release control corresponding to the path information. Then, when the path release is completed, the ATM switch 10 sends OAM cells that is the path release completion information containing the path information P for the released path and a path release reply identifier U, to the subscriber device 1, using an OAM cell path (VC) (not shown) containing a VCI (virtual channel identifier) different from the released data path (VC).

The seventh embodiment is now described in greater detail, making reference to FIGS. 18 and 19. In FIG. 18, when an OAM cell containing a path release request message is sent from the subscriber device 1, the line device 12 extracts the message from the OAM cell (step S701), and the OAM controller 14 analyzes the message(step S702). The call Controller 18, thereupon, communicates a path release request to the call route controller 16 (step S703). The call route controller 16, based on this path release request, communicates path release information to the line device 12 (step S704). The line device 12 releases the path in response to the path release information from the call route controller 16; that is, it performs a call release (step S705). When the call release is completed, the call controller 18 clears the call processing data corresponding to the released path in the memory 20.

Then, advancing to step S707 in FIG. 19, the call controller 18 communicates the completion of the path release to the OAM controller 14. The OAM controller 14 compiles the path release completion information in an OAM cell format and sends this to the line device 12 (step S708). The line device 12 sends it as OAM cells to the subscriber device 1 (step S709).

Figure 21:
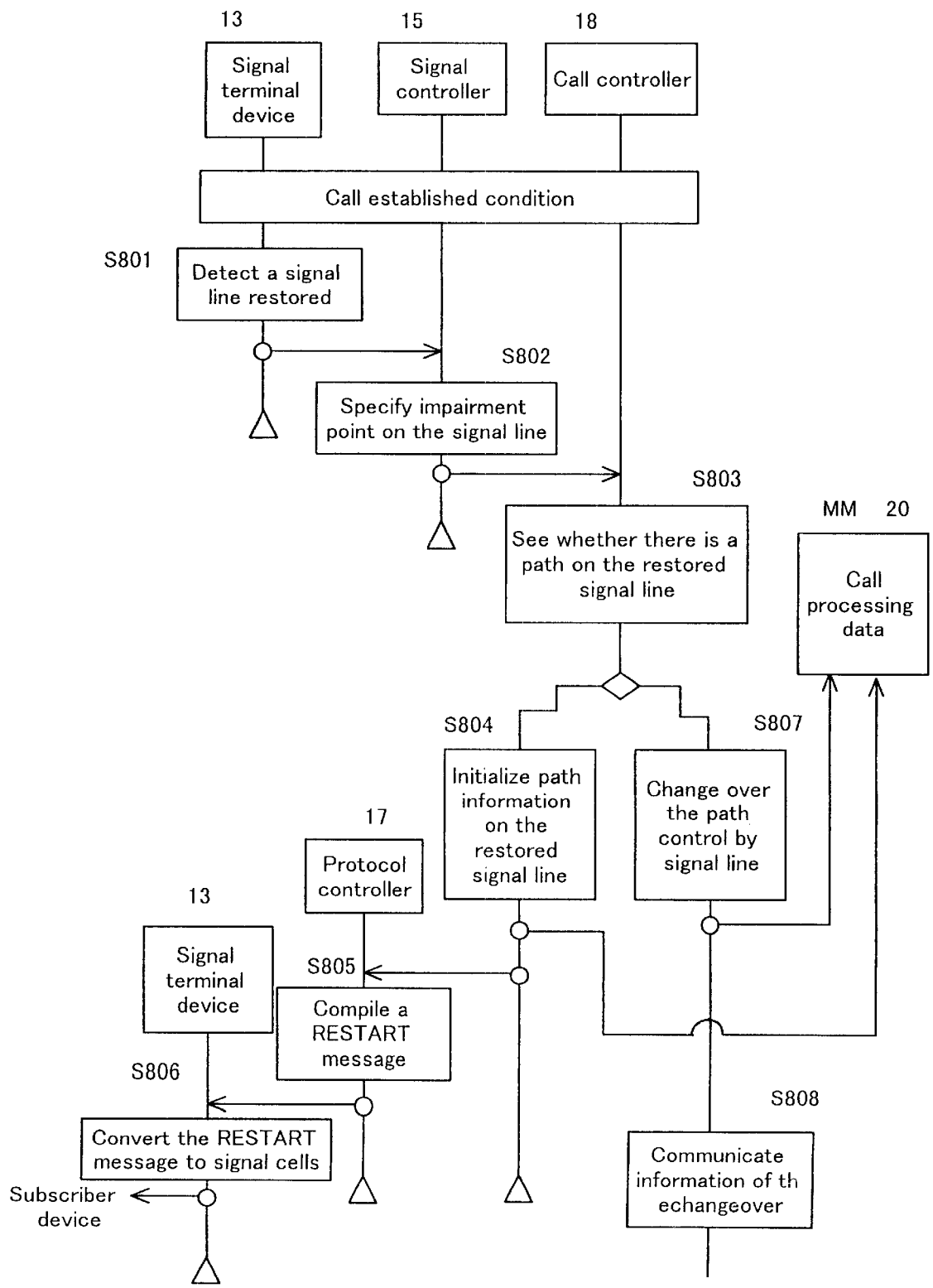
FIG. 21 is processing flowchart (1 of 2) for the eighth embodiment of the present invention.
Figure 22:
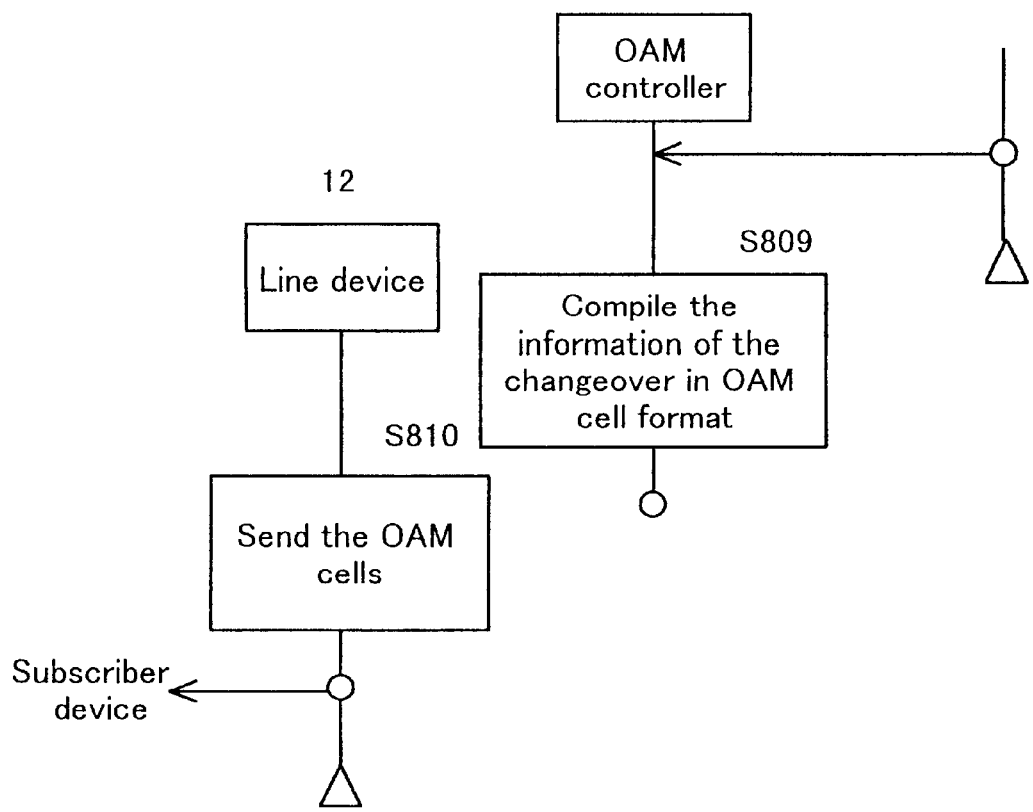
FIG. 22 is a processing flowchart (2 of 2) for the eighth embodiment of the present invention.

FIG. 20 is a diagram for explaining signal line restart information control when a signal line has been restored, which is an eighth embodiment of the present invention. FIGS. 21 and 22 are processing flowcharts for this eighth embodiment.

Figure 20A:
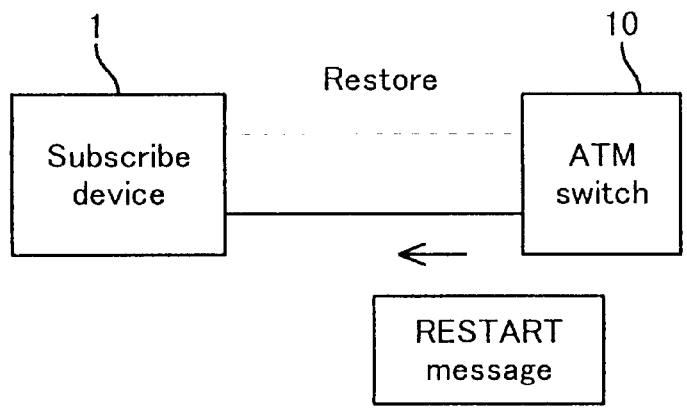
FIG. 20 is a diagram for explaining path preservation control in an eighth embodiment of the present invention.

When things are normal, as represented in FIG. 20(a), and an impaired signal line has been restored, a restart message (RESTART message) notifying that the signal line has been reopened is sent to the subscriber device 1, from the ATM switch 10, using the restored signal line. However, when a restart message is sent when a path is established, the ATM switch 10 goes ahead and performs path release control, based on the sending of the restart message. Accordingly, when an impairment has occurred in a signal line, if a path is being preserved by any of the first through sixth embodiments noted above, when the restart message is sent using the signal line, there is a danger that the path will be released against the will of the subscriber, which is not desirable.

Figure 20B:
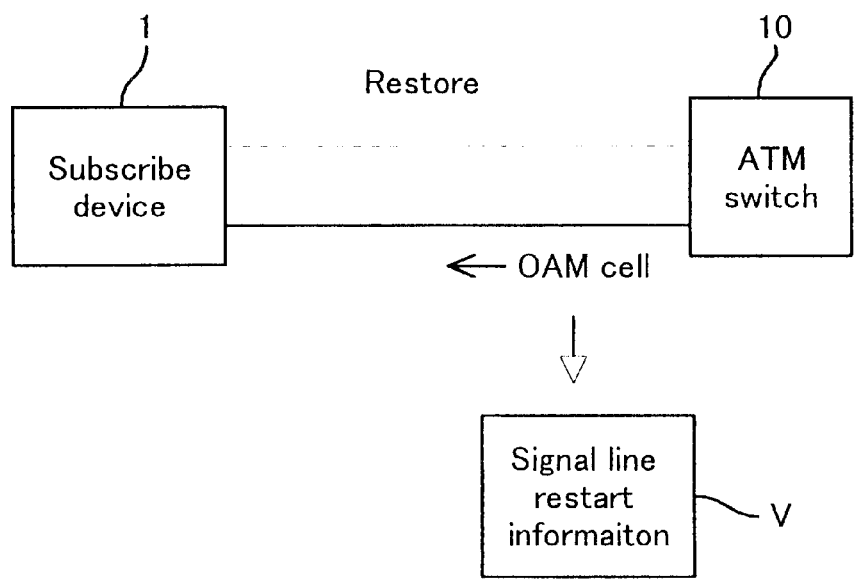

This being so, in this eighth embodiment, as diagrammed in FIG. 20(b), at signal line restart information for informing restoring the signal line is communicated to the subscriber device 1 using an OAM cell. More specifically, the OAM cell contains the signal line restart information V that is to the effect that, since the signal line has been restored, the path control that had been conducted by OAM cells (as, for example, when path control has been changed and set to OAM cell control by the path preservation control described earlier, when an impairment has occurred in a signal line, as is done by step S103 in FIG. 3) is therewith returned (switched over) to path control by signal line.

This eighth embodiment is now described in greater detail, making reference to FIGS. 21 and 22. In FIG. 22, in a state wherein a path is being preserved (call established state), the signal terminal device 13 detects that the signal line has been restored (step S801). The signalcontroller15 specifies the containment location in the signal line where the restoration has been made (step S802). then the call controller 18 reads from the call processing data in the memory 20 to see whether there is a path on the restored signal line (step S803).

If no call has been established, that is, if the path is not being preserved, then normal processing is performed. That is, the call controller 18 initializes path information on the restored signal line (step S804), and communicates that information to the call processing data in the memory 20 and to the protocol controller 17. The protocol controller 17 compiles a RESTART message (step S805), and sends it to the signal terminal device 13. The signal terminal device 13 converts that RESTART message to signal cells (step S806), and sends it to the subscriber device 1 via the restored signal line.

Meanwhile., when a call exists, that is, when a path is being preserved, in step S807, the call controller 18 sets the call processing data in the memory 20 so that path control is changed over to control by signal line. Then it communicates information of the changeover to the OAM controller 14 (step S808). In FIG. 22, the OAM controller 14 compiles the information of the changeover in an OAM cell format (step S809). The line device 12 sends it as OAM cells to the subscriber device 1.

In the embodiments described in the foregoing, path preservation control between the subscriber device 1 and the ATM switch 10 is discussed. However, the same path preservation control is performed between ATM switch 10 (between stations).

Figure 23:
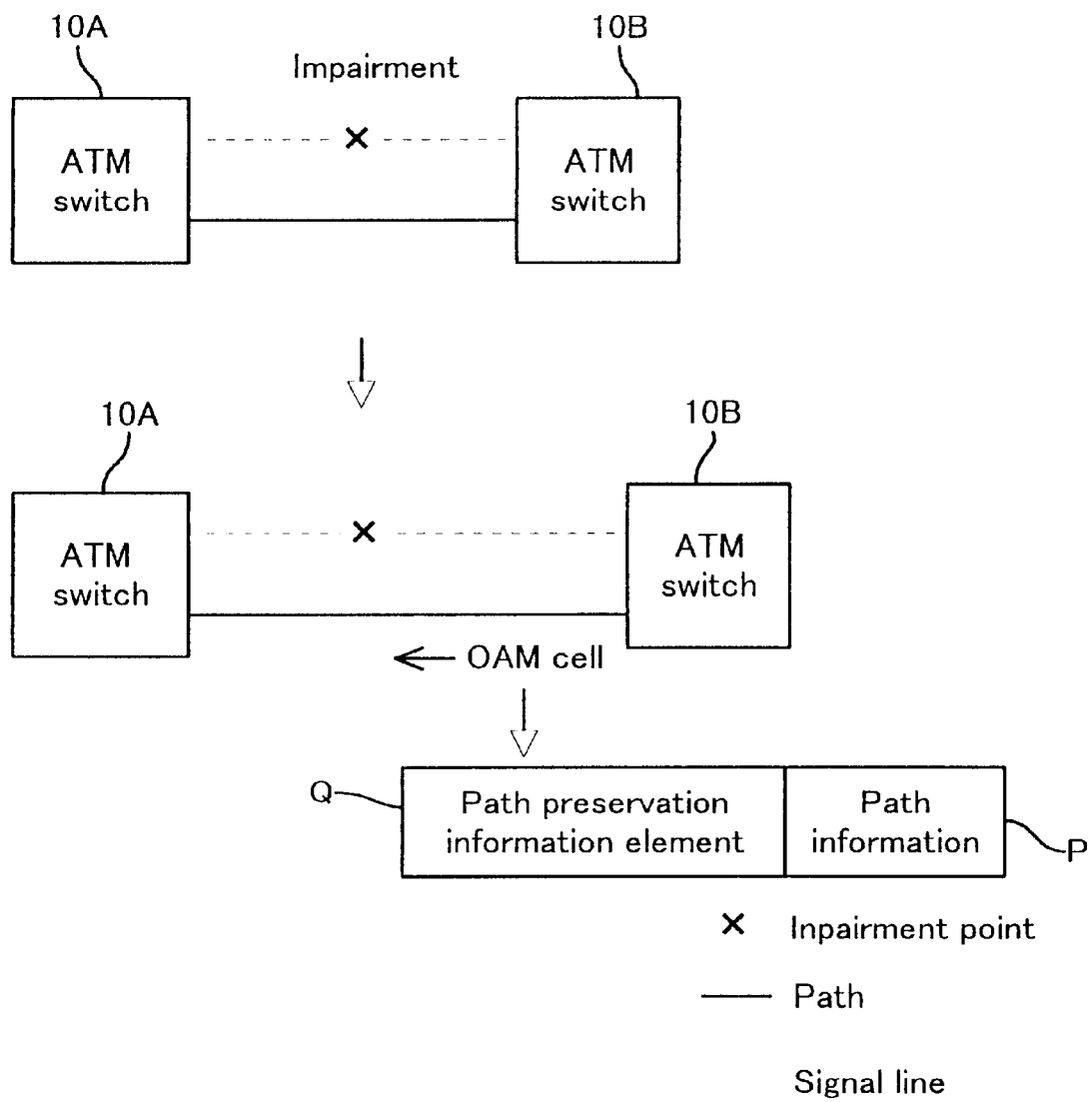
FIG. 23 is a diagram for explaining inter-station path preservation control in the first embodiment of the present invention.

FIG. 23 is a diagram for explaining inter-station path preservation control corresponding to the first embodiment of the present invention. In FIG. 23(a), when an impairment has occurred in a signal line between ATM switch 10A and 10B, the ATM switch does not release the path between it and the subscriber device 1. At this time, the ATM switch 10 that performs the path preservation control may be either ATM switch 10A or 10B, but this must be set to one or the other beforehand. In FIG. 23, it is assumed that the ATM switch that performs path preservation control is the ATM switch 10B, for example.

In FIG. 23(b), ATM switch 10B sends a message to the effect that the path has been preserved over the path to the ATM switch 10A, using an OAM cell. This OAM cell, as in the first embodiment, comprises information P on the path preserved and a path preservation information element Q.

The detailed flowchart for this inter-station path preservation control is almost the same as FIG. 3. Here, however, in FIG. 3, the line device 12 sends an OAM cell to the ATM switch 10A.

Figure 24A:
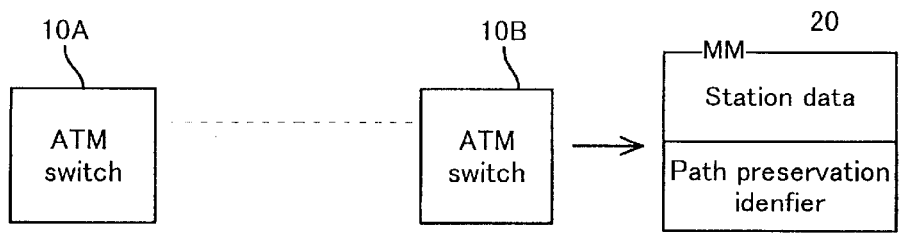
FIG. 24 is a diagram for explaining inter-station path preservation control in the second embodiment of the present invention.

FIG. 24 is a diagram for explaining inter-station path preservation control corresponding to the second embodiment of the present invention. In FIG. 24(a), when an impairment occurs in the signal line between the stations, a path preservation identifier which contains information on whether or not to preserve the path with the ATM switch 10A is set in the station data in the memory (MM) 20 of the ATM switch 10B. The path preservation identifier may be a flag, for example, as in the second embodiment, with a flag state of "1" indicating "preserve" and a flag state "0" indicating "release." The setting of path preservation identifiers is done by a maintenance terminal (not shown) beforehand.

Figure 24B:
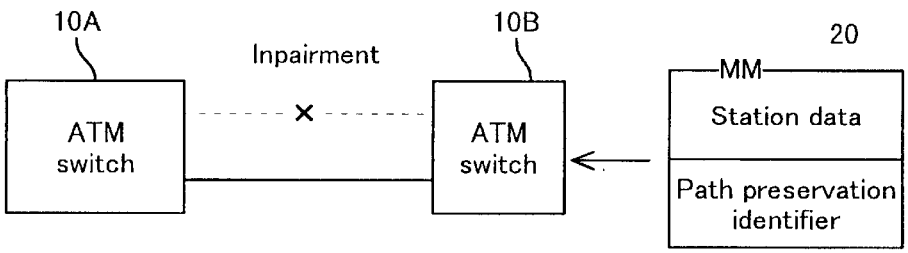
Figure 24C:
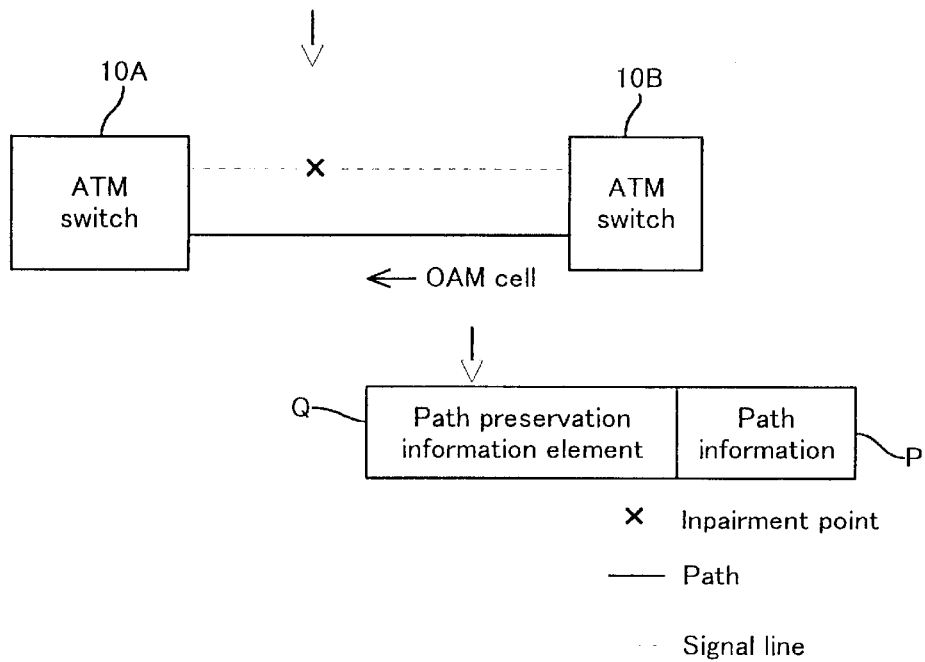

In FIG. 24(b), when an impairment has occurred in the signal line between the stations, the ATM switch 10B reads out the path preservation identifier that corresponds to the ATM switch 10A from the station data in its memory 20. If the path preservation identifier so read out indicates "preserve," the ATM switch 10B does not release the path established between it and the ATM switch 10A. And, in FIG. 24(c), the ATM switch 10B sends a message to the effect that the path has been preserved to the ATM switch 10A, over the path, using an OAM cell. This OAM cell comprises path information P and a path preservation information element Q, as previously described.

The detailed flowchart for this inter-station path preservation control is almost the same as that given in FIG. 5. Here, however, in FIG. 5, the line device 12 sends the OAM cell to the ATM switch 10A, and the path preservation identifier is store d in the station data in the memory 20.

Figure 25A:
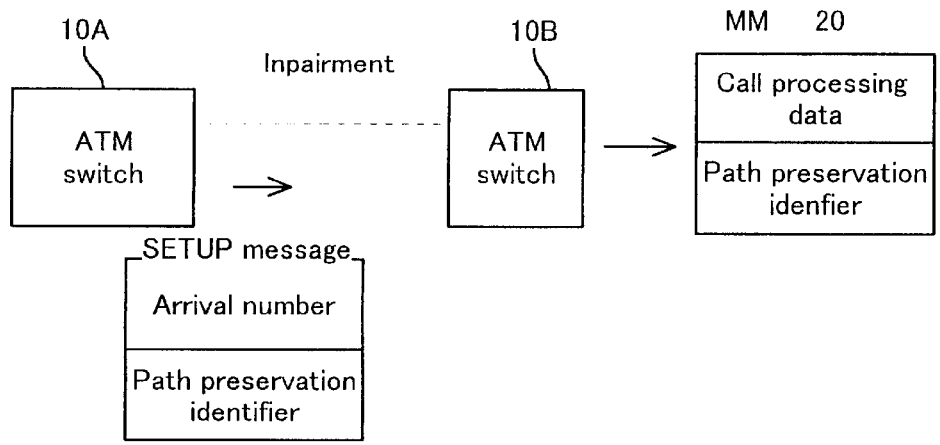
FIG. 25 is a diagram for explaining inter-station path preservation control in the third embodiment of the present invention.

FIG. 25 is a diagram for explaining inter-station path preservation control corresponding to the third embodiment in the present invention. In FIG. 25(a), an arrival number, etc., and a path preservation identifier are set in a call establishment message (SETUP message) when a call establishment is being requested from the ATM switch 10A. The ATM switch 10B takes the path preservation identifier contained in the call establishment message received and stores it as call processing data in the memory 20.

Figure 25B:
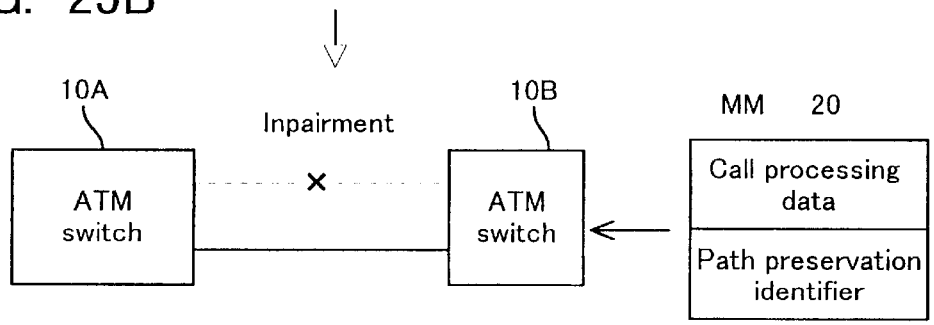
Figure 25C:
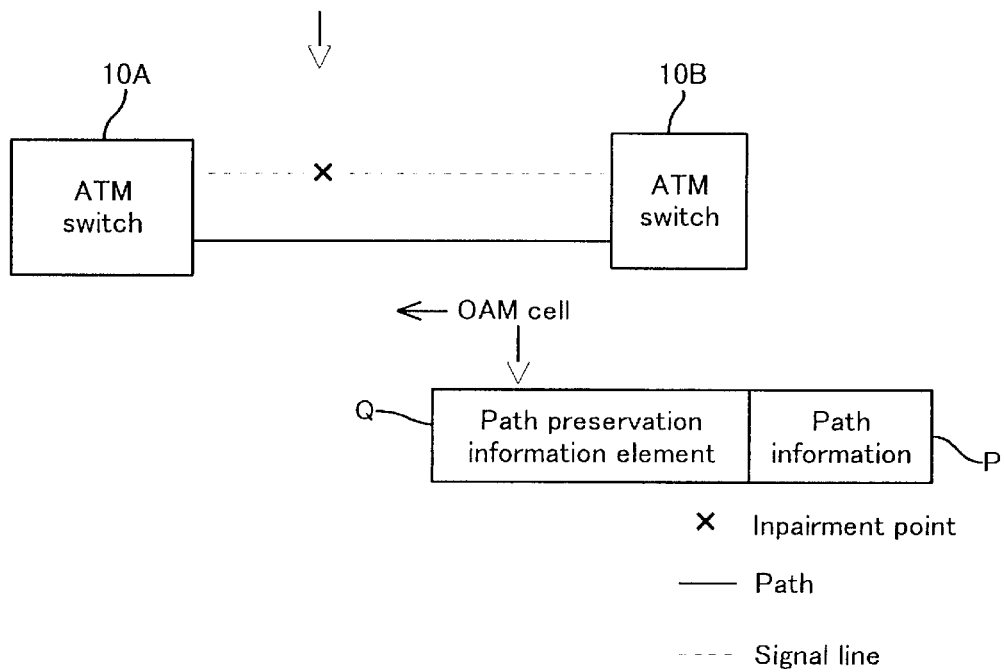

In FIG. 25(b), when an impairment has developed in a signal line between the stations, the path preservation identifier is referenced. If the path preservation identifier is "preserve," then the path is not released, but is preserved intact. In FIG. 25(c), an OAM cell containing path information P and a path preservation information element to the effect that the path has been preserved is communicated to the subscriber device 1.

The detailed flowcharts for this inter-station path preservation control are roughly the same as those given in FIG. 7 and 8. Here, however, in FIG. 7 and 8, the line device 12 sends the OAM cell to the ATM switch 10A.

Figure 26A:
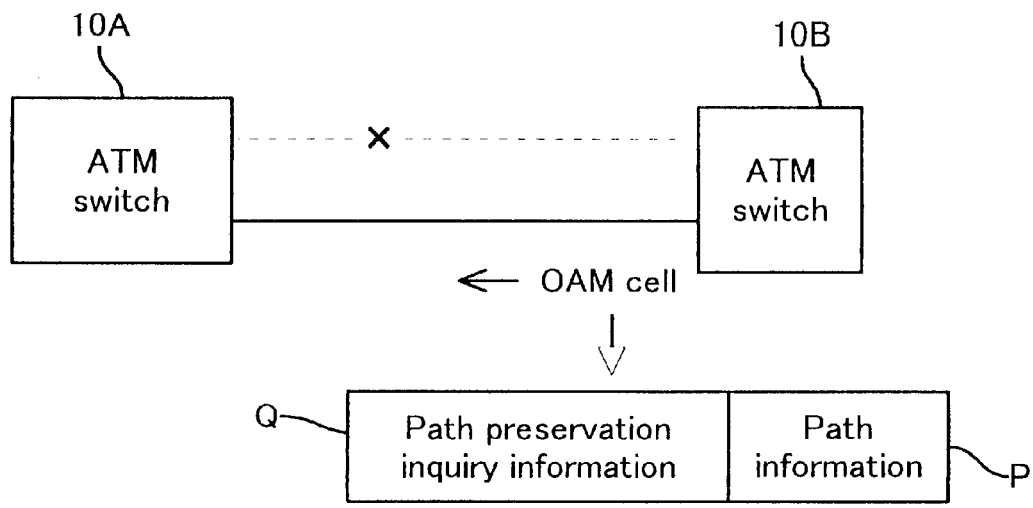
FIG. 26 is a diagram for explaining inter-station path preservation control in the fourth embodiment of the present invention.

FIG. 26 is a diagram for explaining inter-station path preservation control corresponding to the fourth embodiment of the present invention. In FIG. 26(a), when an impairment has occurred in a signal line between the stations, the ATM switch 10B sends an OAM cell to the ATM switch 10A to inquire whether or not to preserve the path that is established between itself and the ATM switch 10A. This OAM cell comprises path information P and path preservation inquiry information R inquiring about the preservation of that path.

Figure 26B:
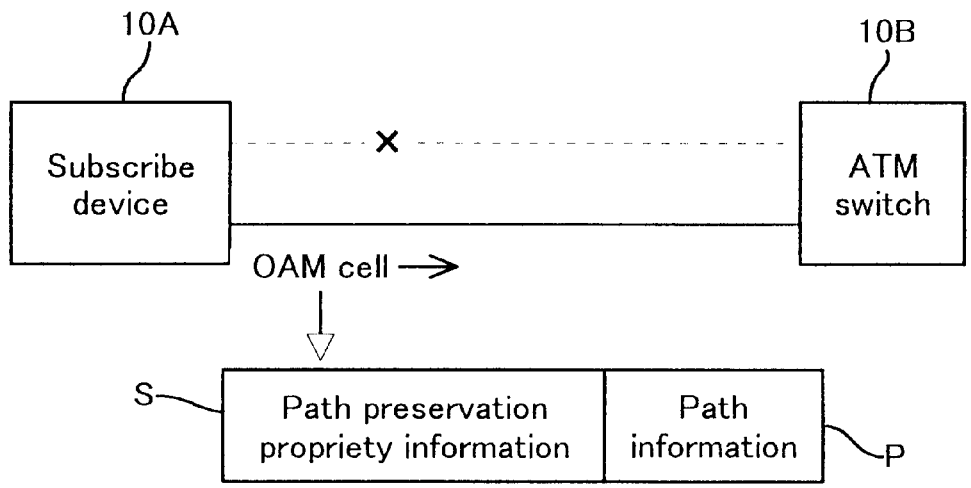

In FIG. 26(b), the ATM switch 10A, having received an OAM cell from the ATM switch 10B, notifies of the propriety of path preservation by means of an OAM cell. This OAM cell contains path information and path preservation propriety information that indicates the propriety of preserving the path, as in the fourth embodiment. If the path preservation propriety information contained in the OAM cell sent from the ATM switch 10A is "preserve," then the ATM switch 10B does not release the path, but preserves it intact.

The detailed flowchart for this inter-station path preservation control is almost the same ag the one given in FIG. 10. Here, however, in FIG. 10, the line device 12 sends the OAM cell to the ATM switch 10A.

Figure 27A:
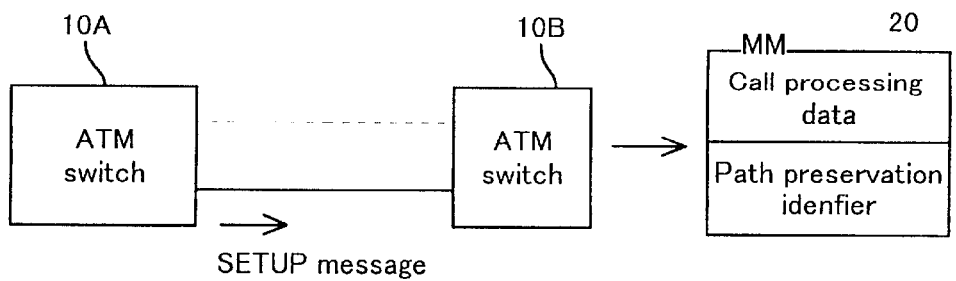
FIG. 27 is a diagram for explaining inter-station path preservation control in the fifth embodiment of the present invention.

FIG. 27 is a diagram for explaining inter-station path preservation control corresponding to the fifth embodiment of the present invention. In FIG. 27(a), when a state exists wherein a call has been established between the ATM switch 10A and the ATM switch 10B, a call state verification message (STATUS message) is sent from the ATM switch 10A. This call state verification message contains path information P and a path preservation identifier Q. The ATM switch 10B, having received the call state verification message, stores the path preservation identif ier in the call processing data in the memory 20.

Figure 27B:
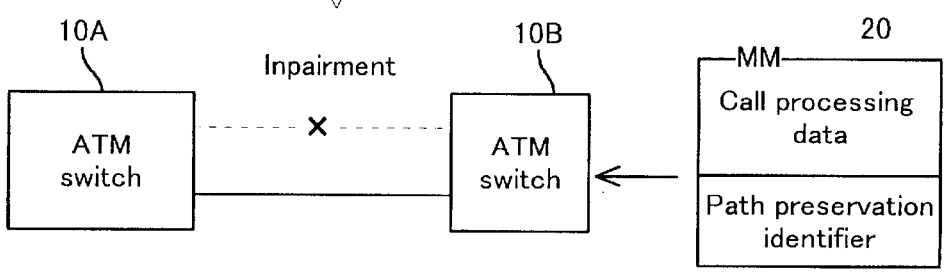
Figure 27C:
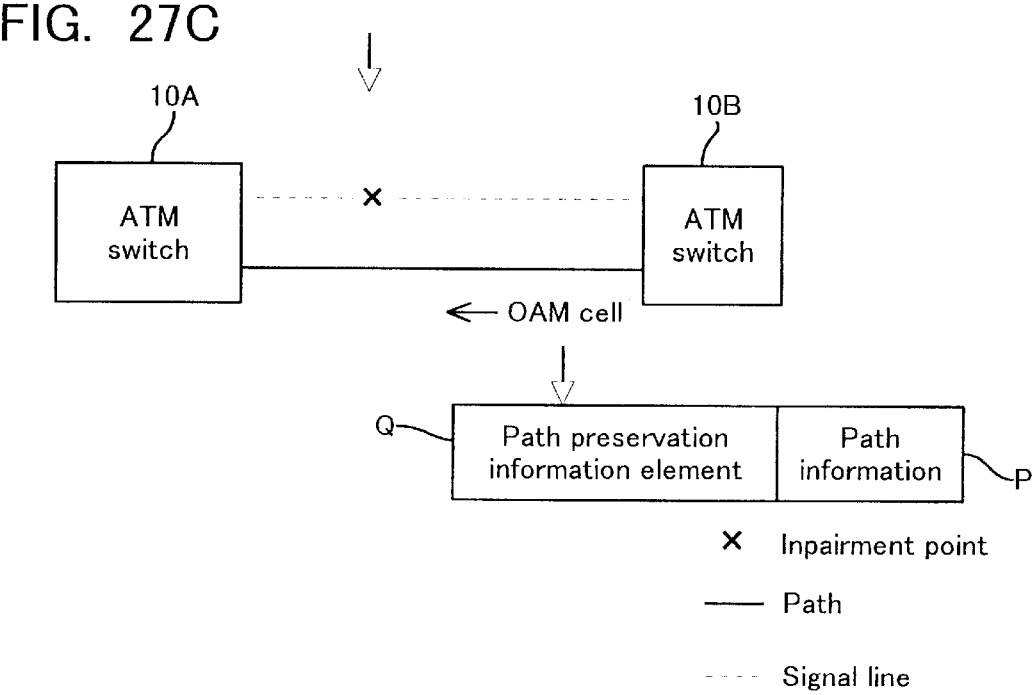

In FIG. 27(b), when an impairment has occurred in a signal line between the stations, ATM switch 10B reads a path preservation identifier corresponding to ATM switch 10A out of the call processing data stored in the memory 20. When this path preservation identifier is "preserve," ATM switch 10B does not release the path established between it and ATM switch 10A. In FIG. 27(c), ATM switch 10B uses an OAM cell to send a message to the effect that the path has been preserved to ATM switch 10A over the path. This OAM cell, as noted in the foregoing, contains path information P and a path preservation information element Q.

The detailed flowcharts for this inter-station path preservation control are almost the same as those given in FIGS. 12 and 13. Here, however, in FIG. 12, the call state verification message is sent from the ATM switch 10A. And in FIG. 13, the line device 12 sends the OAM cell to ATM switch 10A.

Figure 28A:
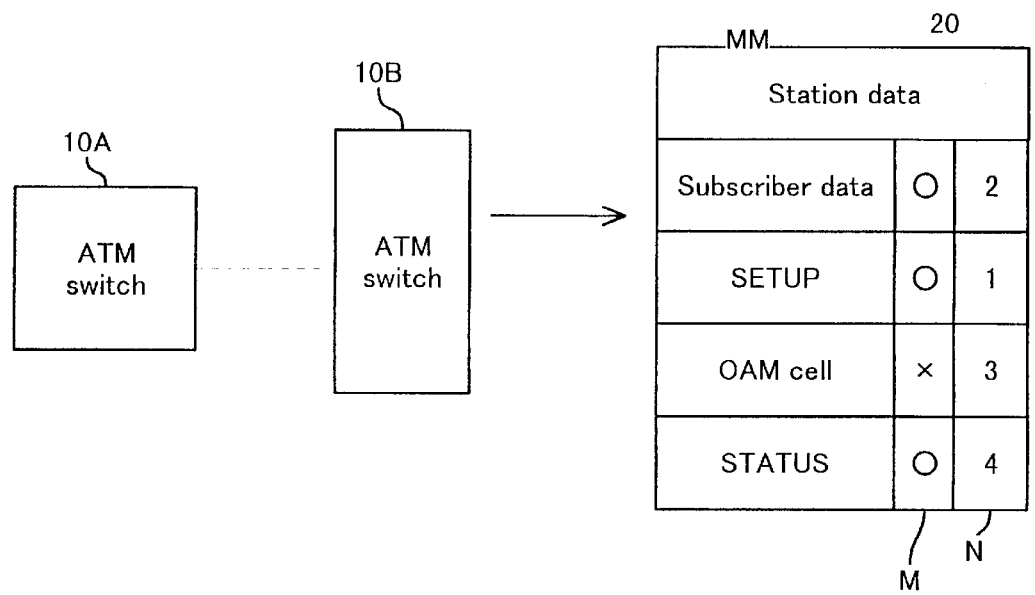
FIG. 28 is a diagram for explaining inter-station path preservation control in the sixth embodiment of the present invention.

FIG. 28 is a diagram for explaining inter-station path preservation control corresponding to the sixth embodiment of the present invention. In FIG. 28(a), a permission flag M for selecting path preservation control from among the inter-station path preservation control methods noted above, when an impairment has occurred in a signal line, and a priority N for making the selection, are set in the station data in the memory 20.

Figure 28B:
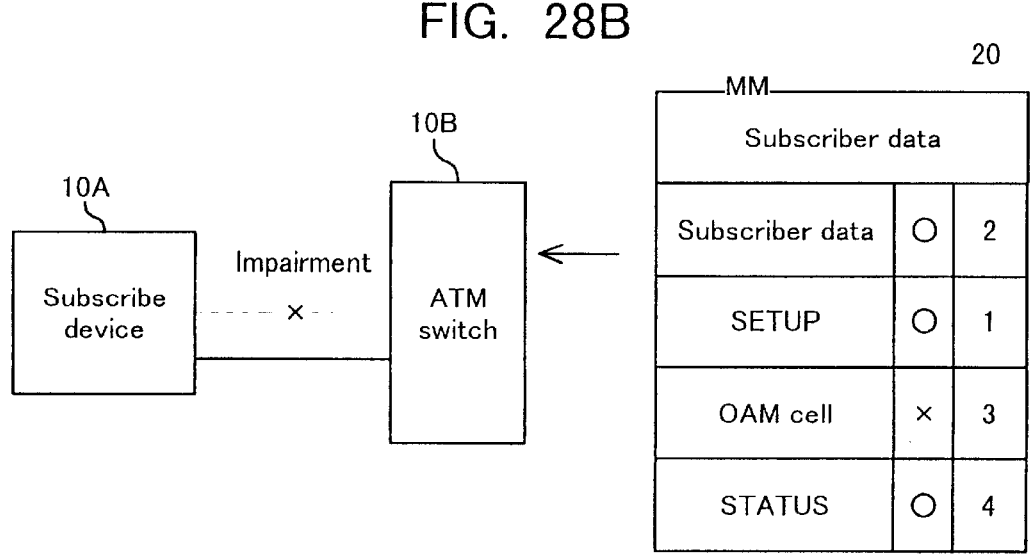

Then, in FIG. 28(b), when an impairment has occurred in a signal line, the path preservation control method having the highest priority and for which the permission flag is "permitted" is selected. However, when no path preservation identifier corresponding to the selected path preservation control method is stored in the memory 20, the path preservation control method having the next highest priority and for which the permission flag is "permitted" is selected.

The detailed flowcharts for this inter-station path preservation control are almost the same as those given in FIGS.

15 and 16. Here, however, in FIG. 15 and 16, the permission flag and priority are stored in the station data in the memory 20.

FIG. 29 is a diagram for explaining inter-station path release control corresponding to the seventh embodiment of the present invention. When things are normal, either a path release request information or a path release completion information ins sent over a signal line. In the embodiments described in the foregoing, however, when a path has been preserved, even though an impairment has occurred in the signal line, that signal line cannot be used.

Figure 29A:
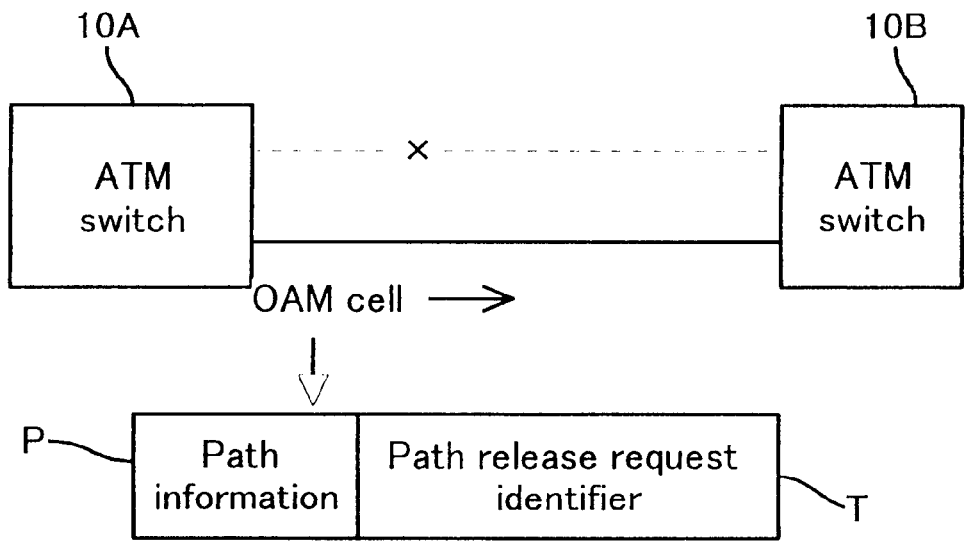
FIG. 29 is a diagram for explaining inter-station path preservation control in the seventh embodiment of the present invention.

This being so, in FIG. 29(a), ATM switch 10A sends an OAM cell containing path information P for the path being preserved, and a path release request identifier T that is a path release request information, to ATM switch 10B via the path.

Figure 29B:
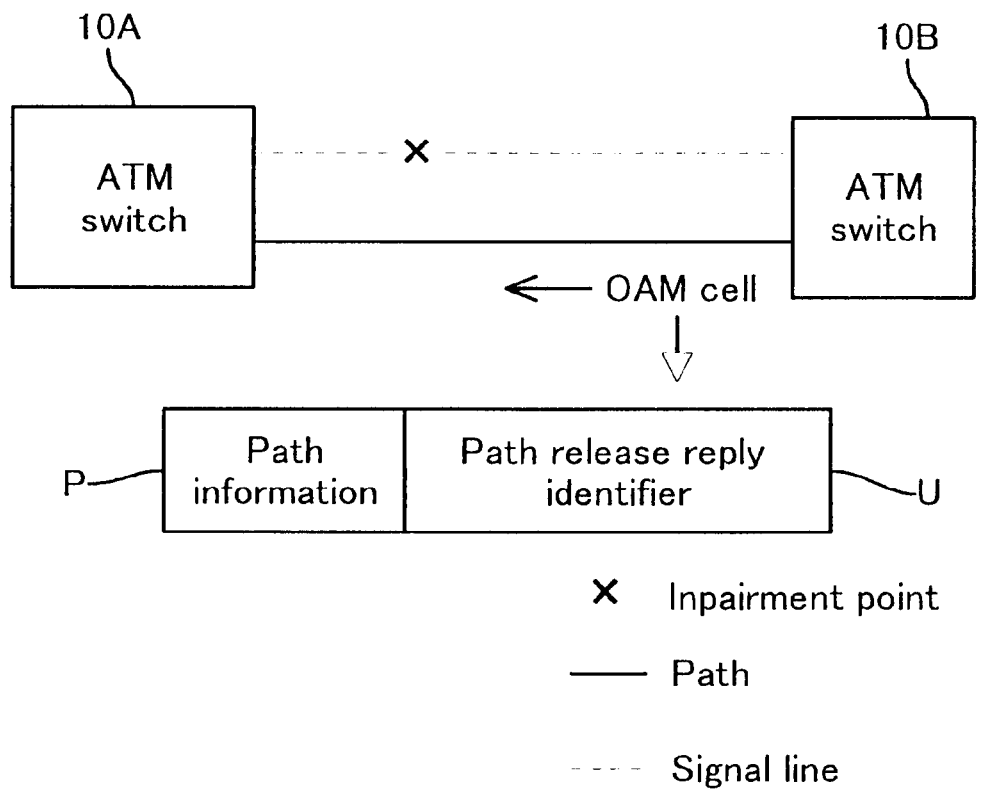

In FIG. 29(b), the ATM switch 10B, having received an OAM cell containing a path release request identifier, performs path release control corresponding to the path information P. Then, when the path release is completed, ATM switch 10B sends an OAM cell containing the path information P for the released path and the path release reply identifier U that is the path release completion information, to the ATM switch 10A, using an OAM cell path (VC) (not shown) containing a VCE (virtual channel identifier) different from the data path (VC) that was released.

The detailed flowcharts for this inter-station path preservation control are almost the same as those given in FIGS. 18 and 19. Here, however, in FIG. 18, the call severance request message is sent from the ATM switch 10A. And in FIG. 19, the line device 12 sends the OAM cell to the ATM switch 10A.

Figure 30A:
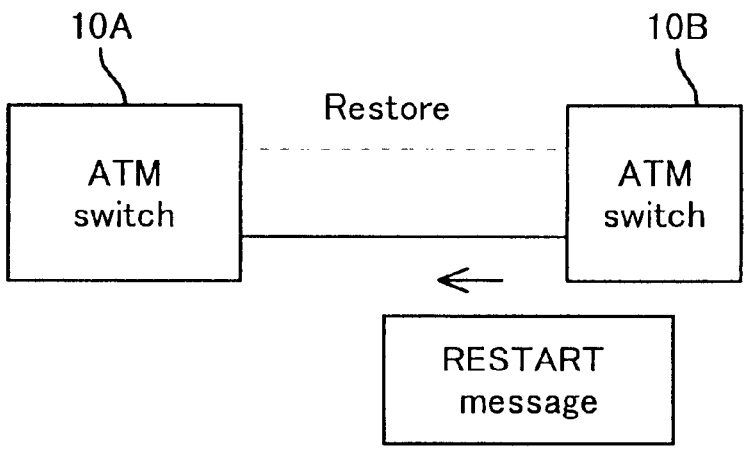
FIG. 30 is a diagram for explaining inter-station path preservation control in the eighth embodiment of the present invention.
Figure 30B:
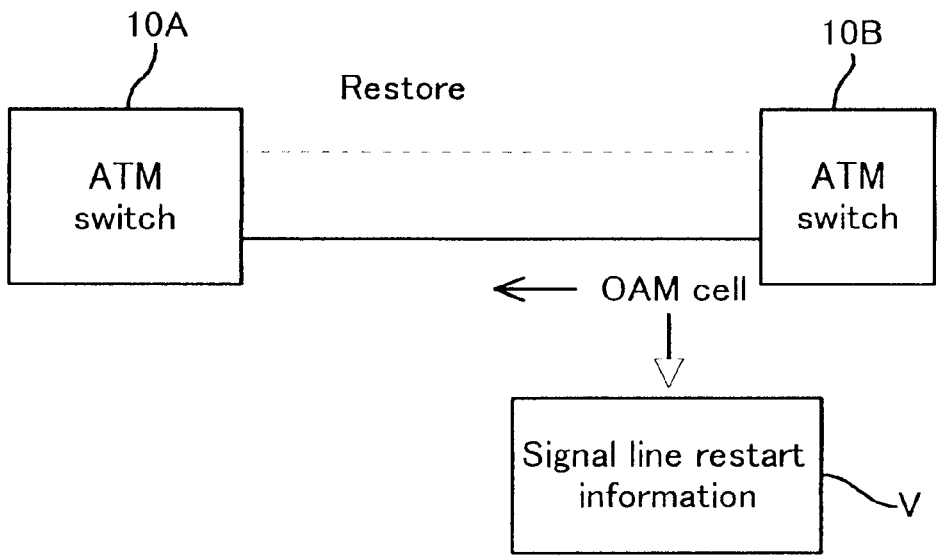
Figure 31:
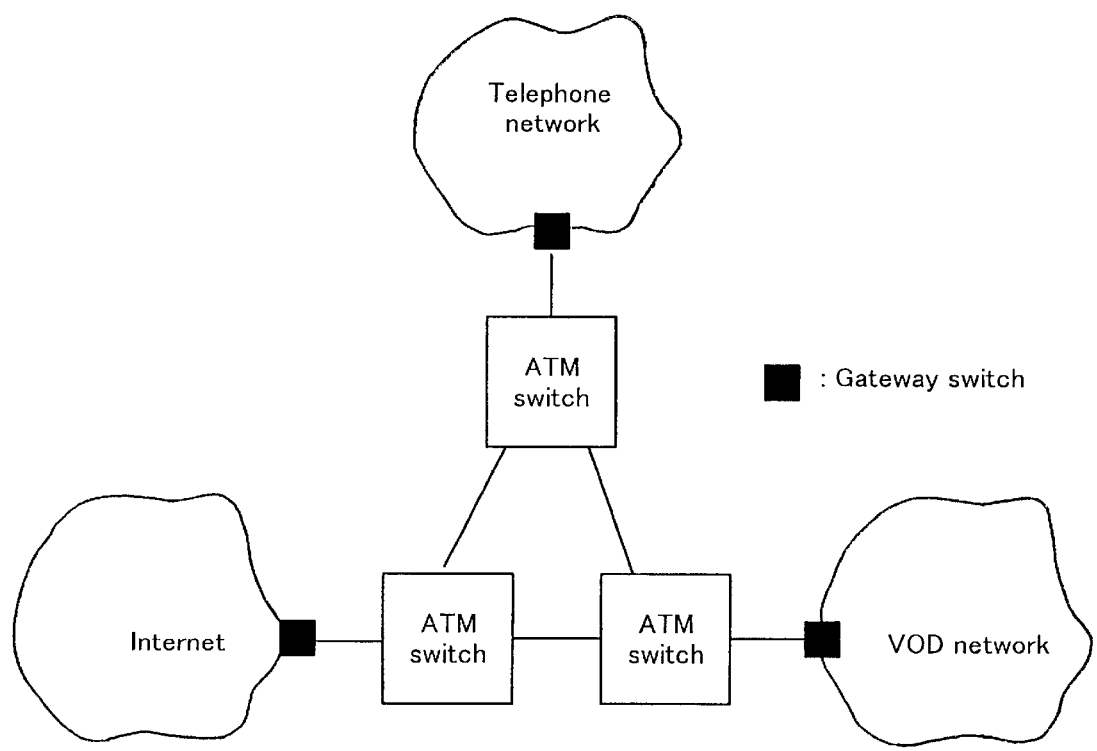
FIG. 31 is a diagram that represents an example configuration of an ATM network system.
Figure 32:
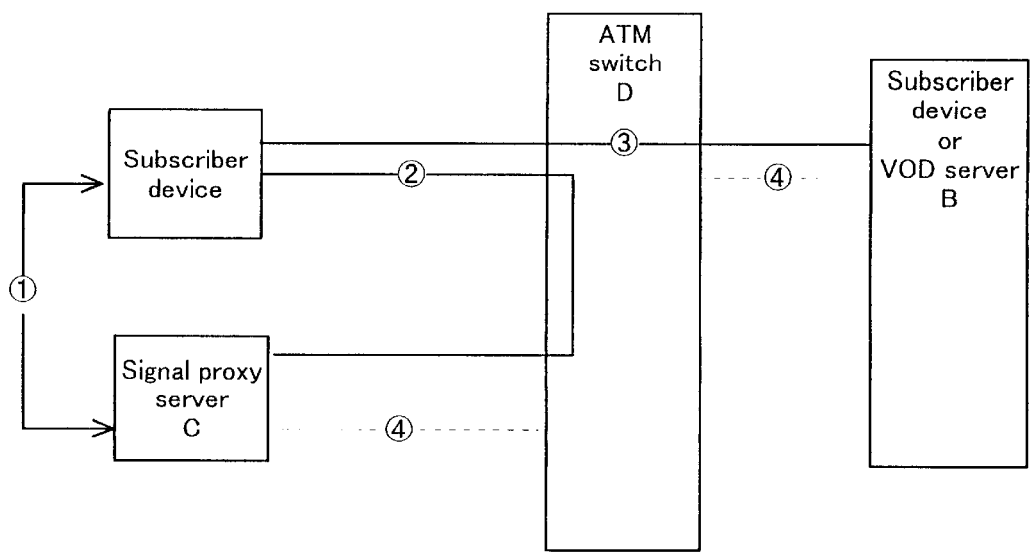
FIG. 32 is a diagram that represents an example TPCC operating configuration.
Figure 33:
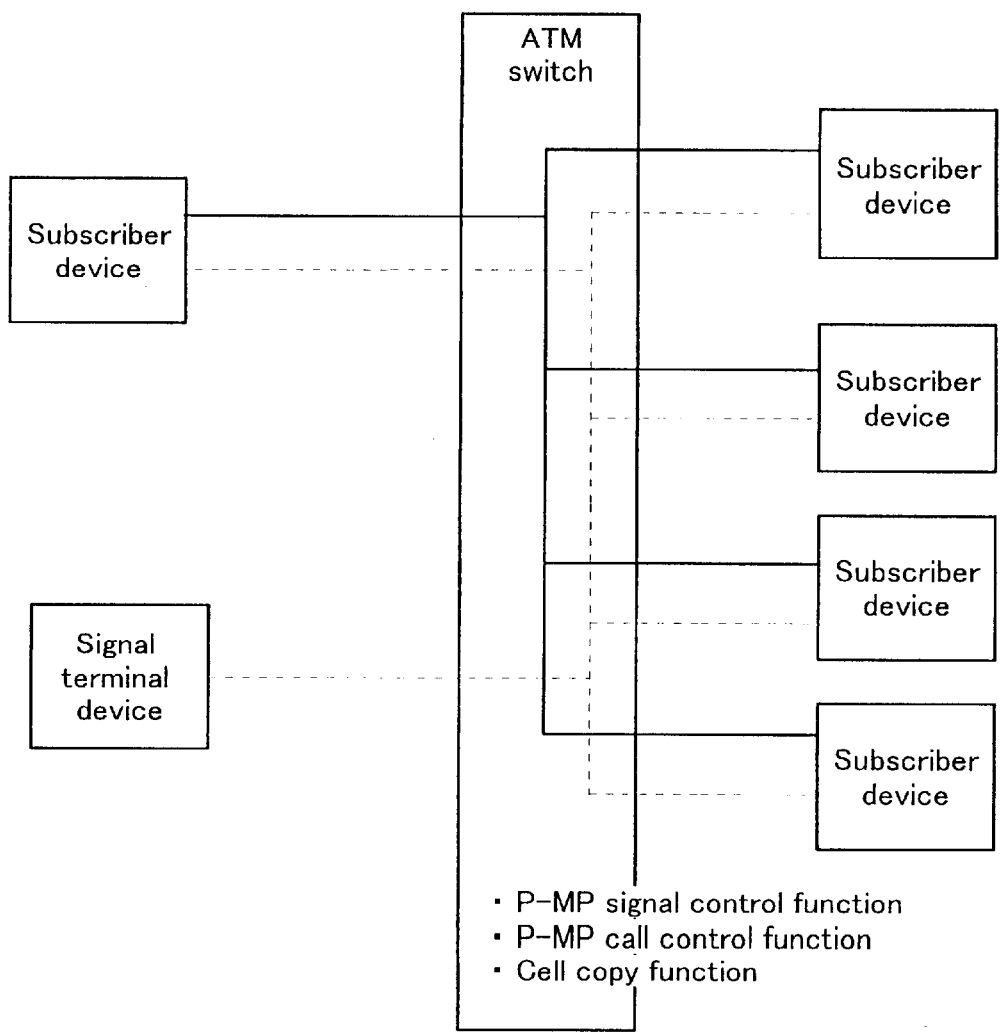
FIG. 33 is a diagram that represents an example point-to-multipoint service operating configuration.

FIG. 30 is a diagram for explaining inter-station signal line restart information control corresponding to the eighth embodiment of the present invention. In FIG. 30(a), when things are normal, and an impaired signal line has been restored, a restart message (RESTART message) notifying that the signal line has been reopened is sent to the ATM switch 10A from the ATM switch 10B, using the restored signal line. However, when a restart message is sent while a path is established, the ATM switch 10B will go ahead and perform path release control, based on the sending of the restart message. That being so, when a path is being preserved by the inter-station path preservation control described above, it is not a good idea to use a signal line to send the restart message. That being so, with this inter-station signal line restart information control, an OAM cell is used to notify the ATM switch 10A that the signal line has been reopened. More specifically, as is diagrammed in FIG. 30(b), the OAM cell contains signal line restart information V to the effect that the path control that was being performed by OAM cell is being returned (switched over) to path control by signal line.

The detailed flowcharts for this inter-station path preservation control are almost the same as those given in FIGS. 21 and 22. Here, however, in FIGS. 21 and 22, the line device 12 sends the OAM. cell to the ATM switch 10A.

When the present invention is employed, as described in the foregoing, an established path (virtual channel (VC)) is not released even when an impairment occurs in a signal line in the ATM network. Accordingly, data communications services transmitted via the paths are not interrupted, and services to subscribers can be improved.

In addition, information of the fact that the path has not been released, but rather has been preserved, and call control signals during signal line impairment, are sent to connected subscriber devices and other ATM switch by means of OAM cells via the path, so that call control can be performed even during signal line impairment.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An asynchronous transfer mode switch, comprising:
   a detector that detects an impairment in a signal line;
   a controller that controls to maintain a path that has been established by call control via the signal line when the impairment has been detected on the signal line by the detector;
   a memory that stores an identifier which designates maintenance of the path or releasing the path in a case where an impairment has been detected on the signal line; and
   wherein the controller controls to maintain the path when the identifier designates maintenance of the path.

2. The asynchronous transfer mode switch according to claim 1, wherein the identifier is sent from a predetermined terminal and is stored in the memory before establishing the path.

3. The asynchronous transfer mode switch according to claim 1, wherein the identifier is included in a call control signal for requesting the path establishing sent from a terminal or another asynchronous transfer mode switch and is stored in the memory.

4. The asynchronous transfer mode switch according to claim 1, wherein the identifier is included in a call control signal for verifying the path state sent from a terminal or another asynchronous transfer mode switch and is stored in the memory.

5. An asynchronous transfer mode switch, comprising:
   a detector that detects an impairment in a signal line;
   a controller that controls to maintain a path that has been established by call control via the signal line when the impairment has been detected on the signal line by the detector; wherein the controller sends inquiry information for inquiring propriety of maintaining the path to the terminal or another asynchronous transfer mode switch via the path, and controls to maintain the path when propriety information in response to the inquiry information indicates maintaining of the path.

6. The asynchronous transfer mode switch according to claim 1, wherein the controller sends information for notifying of maintaining the path to a terminal or another asynchronous transfer mode switch via the path.

7. The asynchronous transfer mode switch according to claim 1, wherein the controller performs the call control via the path.

8. The asynchronous transfer mode switch according to claim 7, wherein the controller releases the path based on information for requesting release of the path sent from a terminal or an another asynchronous transfer mode switch via the path.

9. The asynchronous transfer mode switch according to claim 7, wherein the controller sends signal line restart information for informing of restoring the signal line to a terminal or another asynchronous transfer mode switch via the path and performs the call control via the restored signal line.

10. The asynchronous transfer mode switch according to claim 5, wherein the inquiry infonnation and the propriety information are OAM cells.

11. The asynchronous transfer mode switch according to claim 8, wherein the information for requesting release of the path is OAM cells.

12. A method for controlling an asynchronous transfer mode switch, said method comprising the steps of:

detecting an impairment in a signal line;

controlling to maintain a path that has been established by call control via the signal line when the impairment has been detected on the signal line in the detecting step; and storing an identifier which designates maintaining the path or releasing the path in a case where an impairment has been detected on the signal line; and wherein, in the controlling step, the path is maintained when the identifier designates maintaining the path.

13. A method for controlling an asynchronous transfer mode switch, said method comprising the steps of:

detecting an impairment in a signal line controlling to maintain a path that has been established by call control via the signal line when the impairment has been detected on the signal line in the detecting step;

sending inquiry information for inquiring propriety of maintaining the path to a terminal or another asynchronous transfer mode switch via the path; and sending propriety information in response to the inquiry information from the terminal or the another asynchronous transfer mode switch via the path, and wherein, in the controlling step, the path is maintained when the propriety information designates maintaining the path.

14. The control method according to claim 12, comprising the additional step of:

sending information for notifying of maintaining the path to a terminal or another asynchronous transfer mode switch via the path.

15. The control method according to claim 12, comprising the additional step of performing the call control via the path.

16. The control method according to claim 15, comprising the additional steps of:

sending information for requesting release of the path from a terminal or another asynchronous transfer mode switch; and releasing the path based on the information.

17. The control method according to claim 15, comprising the additional step of:

sending signal line restart information informing of restoration of the signal line to a terminal or another asynchronous mode switch via the path when the signal line has been restored; and performing the call control via the restored signal line.

* * * * *